United States Patent [19]
Takahashi et al.

[11] Patent Number: 5,640,387
[45] Date of Patent: Jun. 17, 1997

[54] DIGITAL LOOP CARRIER APPARATUS FOR LARGE VOLUME DIGITAL SIGNAL TRANSMISSION

[75] Inventors: Shigeki Takahashi; Tsuyoshi Ueshima; Kazuo Tanaka; Eiji Shimose, all of Kanagawa, Japan

[73] Assignee: Fujitsu Limited, Kanagawa, Japan

[21] Appl. No.: 542,652

[22] Filed: Oct. 13, 1995

Related U.S. Application Data

[63] Continuation of Ser. No. 306,199, Sep. 14, 1994, abandoned.

[30] Foreign Application Priority Data

Mar. 15, 1994 [JP] Japan ................................ 6-044311

[51] Int. Cl.⁶ .................................................. H04J 3/02
[52] U.S. Cl. .................... 370/359; 370/376; 370/467; 370/523; 370/528
[58] Field of Search ........................ 370/58.1, 110.1, 370/84, 13, 112, 56

[56] References Cited

U.S. PATENT DOCUMENTS

| | | | |
|---|---|---|---|
| 5,161,152 | 11/1992 | Czerwiec et al. | 370/58.1 |
| 5,185,736 | 2/1993 | Tyrell et al. | 370/84 |
| 5,355,362 | 10/1994 | Gorshe et al. | 370/110.1 |

*Primary Examiner*—Alpus H. Hsu
*Assistant Examiner*—Min Jung

[57] ABSTRACT

A high-speed signal input to and output from a high-speed optical interface part connected to an optical fiber transmission line is switched to different lines such that the switching is conducted by cross connect parts on an arbitrary basis. The high-speed signal is separated so as to obtain the low-speed signal. The low-speed signal output from the cross connect parts is separated so as to obtain the subscriber signal by signal terminal parts. Call connections are conducted for each subscriber by a time slot interchange part, whereupon a subscriber interface part performs analog-to-digital and digital-to-analog conversion so as to serve as an interface for a subscriber.

13 Claims, 22 Drawing Sheets

F I G. 1 1
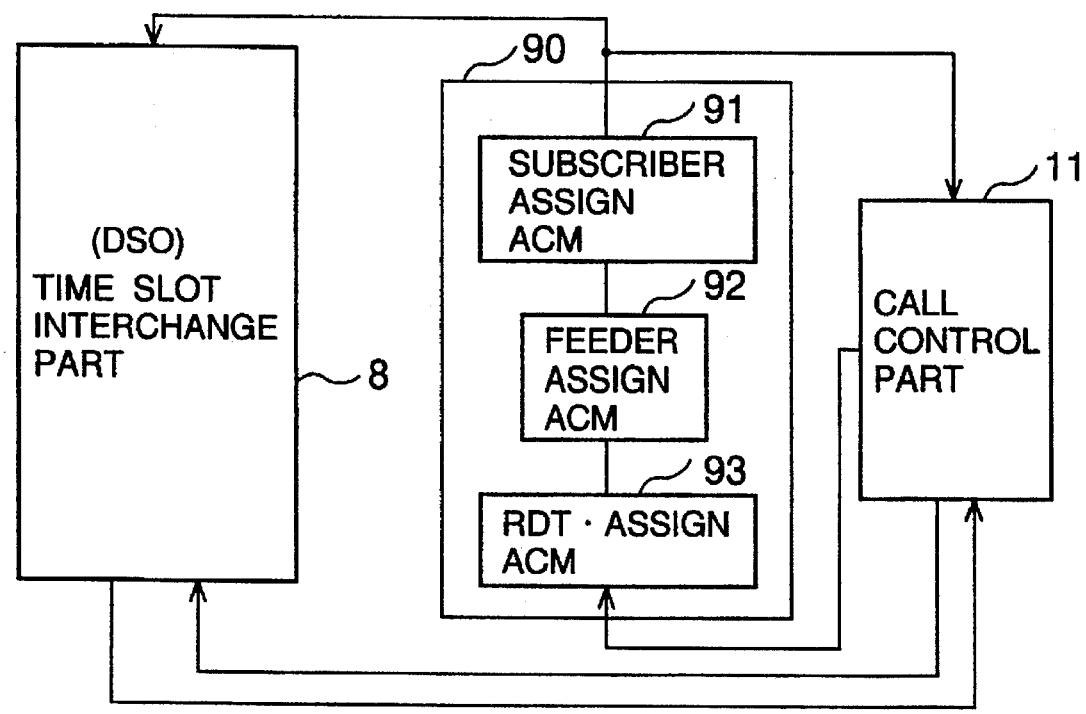

F I G. 13
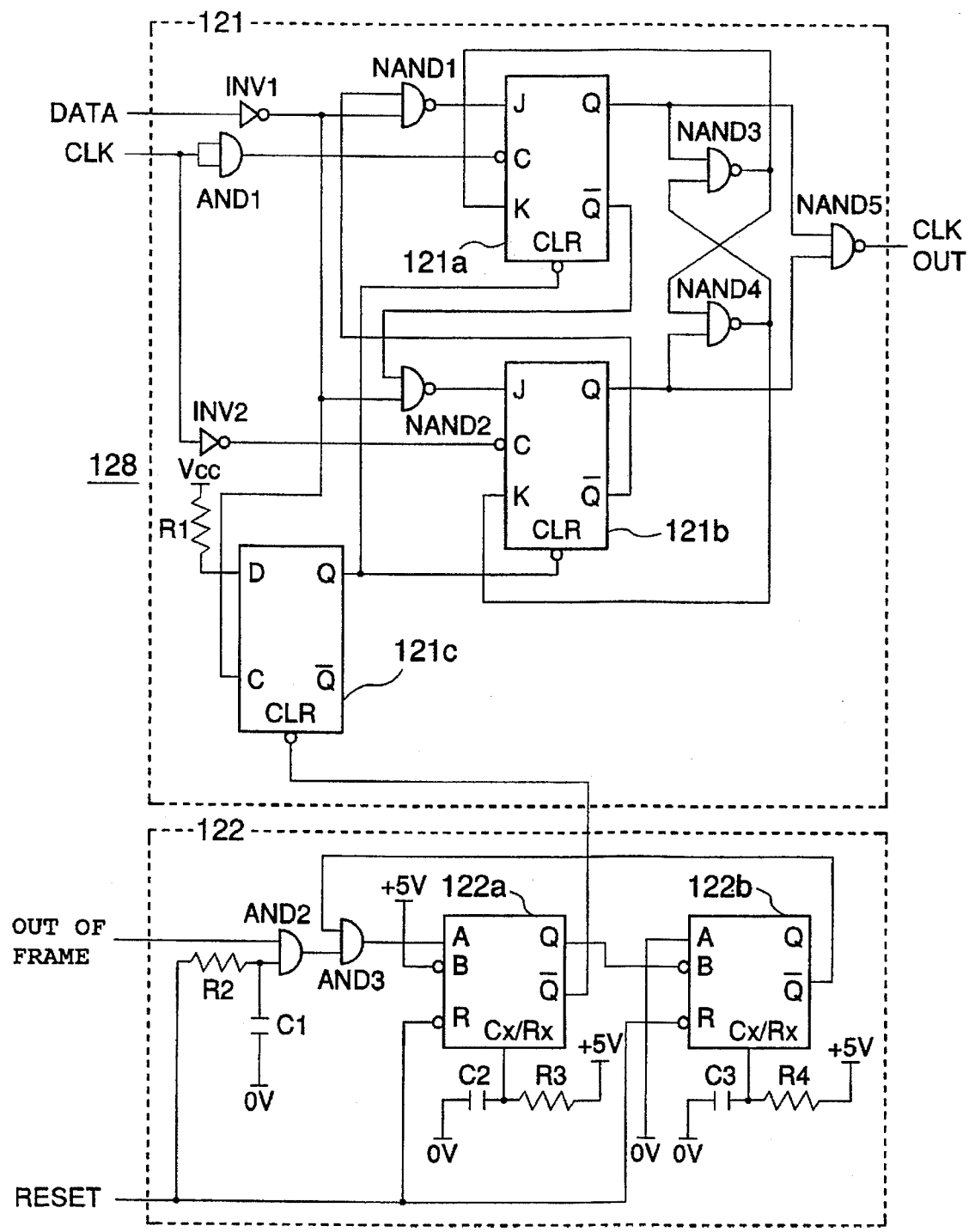

DIGITAL LOOP CARRIER APPARATUS FOR LARGE VOLUME DIGITAL SIGNAL TRANSMISSION

This is a continuation of application Ser. No. 08/306,199, filed Sep. 14, 1994, now abandoned.

BACKGROUND OF THE INVENTION

The present invention relates to digital loop carriers, and more particularly to a digital loop carrier of a digital loop carrier system disposed between switching unit and a subscriber.

Because of the scale and cost of an exchange, there is a limit to the number of exchanges installable. Hence, there is a need to dispose a digital loop carrier between the switching unit and the subscriber so that a part of the functions of the switching unit can be executed by the digital loop carrier.

As shown in FIGS. 1 and 2, when a conventional digital loop carrier 21 is disposed at a remote location with respect to a switching unit 22, the connection between the digital loop carrier 21 and the switching unit 22 is implemented by a primary group signal (sometimes referred to as a T1 digital signal) transmission line 23 using a copper wire.

Specifically, FIG. 1 shows an IDLC (integrated digital loop carrier) configuration in which 24 digital voice channels may be multiplexed together over a 4-wire cable between the digital loop carrier 21 and the switching unit 22. The digital loop carrier 21 demultiplexes the signals on the channels and performs digital-to-analog conversion before delivering the signals to a subscriber 24.

FIG. 2 shows a UDLC (universal digital loop carrier) configuration in which a digital loop carrier 25 is disposed in the exchange 20, and the digital loop carrier 25 is connected with the switching unit 22 via a subscriber interface 26. Signals arriving at the digital loop carrier 25 via the subscriber interface 26 are subjected to analog-to-digital conversion and the multiplexed. The multiplexed signals are transmitted to the other digital loop carrier 21 disposed at a remote location via the primary group signal transmission line 23. The digital loop carrier 21 demultiplexes the arriving signals and subjects them to digital-to-analog conversion. The analog signals are then transmitted to the subscriber 24.

FIG. 3 shows the internal construction of the digital loop carrier 21 (DLC-RT) disposed at a remote location with respect to the exchange.

A description will first be given of the downstream signal. The T1 signal (bipolar signal) from the switching unit 22 is received at a line termination part 27 via the transmission line 23 and changed to a unipolar signal.

The unipolar signal is sent to a low-speed multiplexing/demultiplexing part (DSLMUX/DMUX part) 28 for synchronizing detection so as to obtain a DS0 signal (64k b/s) corresponding to one telephone line. In case the subscriber 24 subscribes to a normal telephone service, a subscriber interface 29 performs digital-to-analog conversion and sends the analog signal to the subscriber 24. A signaling bit superimposed on a main signal sent from the switching unit causes a bell of the subscriber 24 to ring.

A description will be given of the upstream signal. The subscriber interface 29 performs off-hook supervision of the subscriber 24, notifying the exchange unit of an occurrence of a call by means of a signaling bit superimposed on a main signal. The subscriber interface 29 also performs analog-to-digital conversion. The low-speed multiplexing/demultiplexing part 28 multiplexes 24 channels of DS0 signals (64k b/s) from the subscriber interface 29 so as to produce a frame of a DS1 signal (1.5M b/s) The line termination part 27 converts the unipolar DS1 signal to a bipolar signal and sends the same to the exchange. For protection of the transmission between the exchange and the remote station, there may be employed a redundant configuration in which one reserve line termination part is provided for each set of four line termination parts 27 so that a ratio of 4:1 with respect to the transmission line 23 results.

The above described digital loop carrier 21 has a function of concentrating 48 subscriber channels into 24 channels for efficient usage of the T1 signal transmission line 23.

It is expected that as the multimedia technology is used more extensively in the ordinary household, there will be a need to provide, in addition to the conventional service mainly designed for telephone, a digital signal service such as the ISDN, an image service such as the one dealing with video images, and a broadband transmission service using a DS1 signal, a DS3 signal or an OC-3 signal. However, it is impossible for the above described conventional digital loop carrier to transmit a large capacity of digital signals because the transmission line between the digital loop carrier and the switching unit is a T1 signal transmission line using a copper wire.

Another disadvantage of the conventional digital loop carrier is that, because only the copper wire is used for connection, optical fibers can be installed between the exchange and the remote station only after providing optical transmission terminal unit.

Still another disadvantage of the conventional digital loop carrier is that connections of cables must be manually done when the cables are installed newly and when a modification is made to the connection, cables carrying the DS1 signal and the DS0 signal being connected by using a connector panel.

Still another disadvantage of the conventional digital loop carrier is that the conventional concentration function of concentrating 48 channels into 24 channels lacks flexibility. In order to improve a circuit usage efficiency and a block ratio, there is a need to increase channels subjected to the concentration.

Still another disadvantage of the conventional digital loop carrier is that, since the subscriber line is installed outside, it can be easily affected by external noise or shock. This susceptibility to failure requires that a leader line terminal to which measuring instrument can be connected be provided so that the maintenance of the digital loop carrier can be performed.

SUMMARY OF THE INVENTION

Accordingly, an object of the present invention is to provide a digital loop carrier disposed between the switching unit and the subscriber, in which carrier the aforementioned disadvantages are eliminated.

In order to achieve the aforementioned object, the present invention provides a digital loop carrier disposed between a switching unit and a subscriber, the digital loop carrier comprising: a high-speed optical interface part connected to an optical fiber transmission line; cross connect parts for switching, to different lines, a high-speed signal input to and output from the optical interface part, and for separating the high-speed signal to obtain a low-speed signal; signal terminal parts for separating the low-speed signal output from the cross connect part to obtain a subscriber signal; a time slot interchange part for connecting calls for each subscriber; and a interface part for performing analog-to-digital conversion and digital-to-analog conversion, and for serving as an interface for the subscriber.

BRIEF DESCRIPTION OF THE DRAWINGS

Other objects and further features of the present invention will be apparent from the following detailed description when read in conjunction with the accompanying drawings, in which;

FIG. 11 is a block diagram showing the connection between the call control part and a DS0 time slot interchange part used in the digital loop carrier according to the second embodiment;

FIG. 13 is a circuit diagram of a phase detection circuit in the signal transmission part used in the digital loop carrier according to the third embodiment;

DESCRIPTION OF THE PREFERRED EMBODIMENTS

[FIRST EMBODIMENT]

Figure 1:
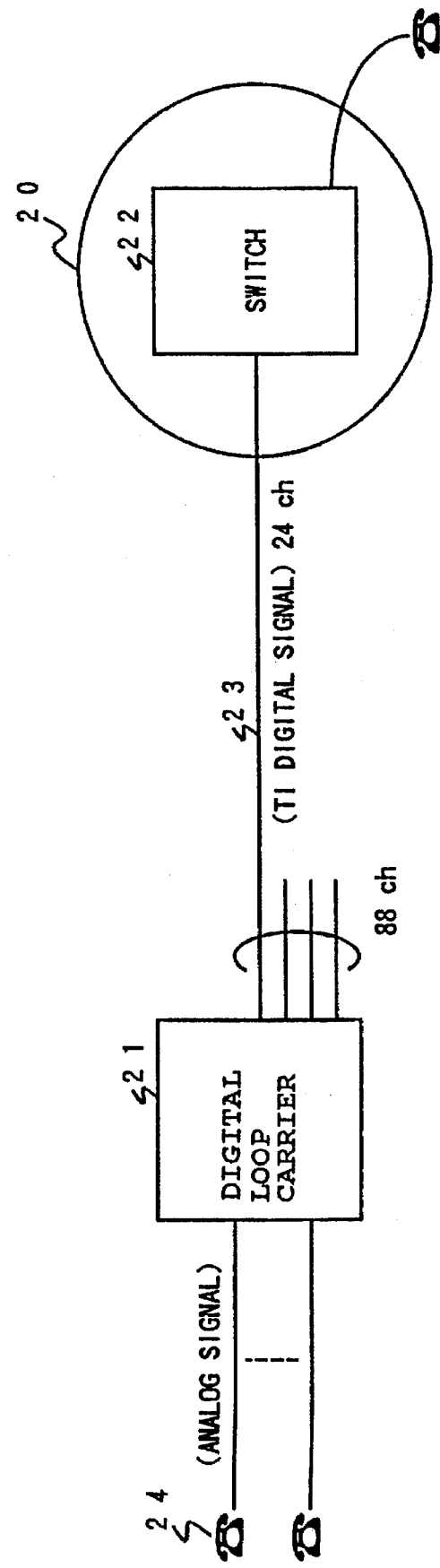
FIG. 1 is a schematic block diagram showing the general construction of a conventional digital loop carrier in which the IDLC configuration is employed.
Figure 2:
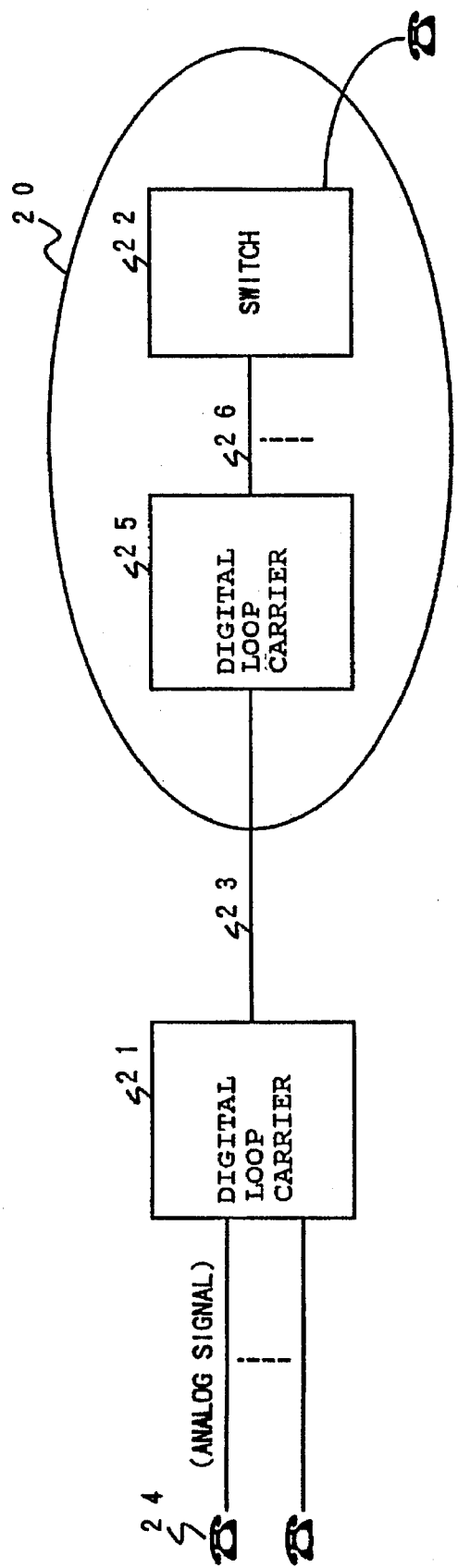
FIG. 2 is a schematic block diagram showing the general construction of a conventional digital loop carrier in which the UDLC configuration is employed.
Figure 3:
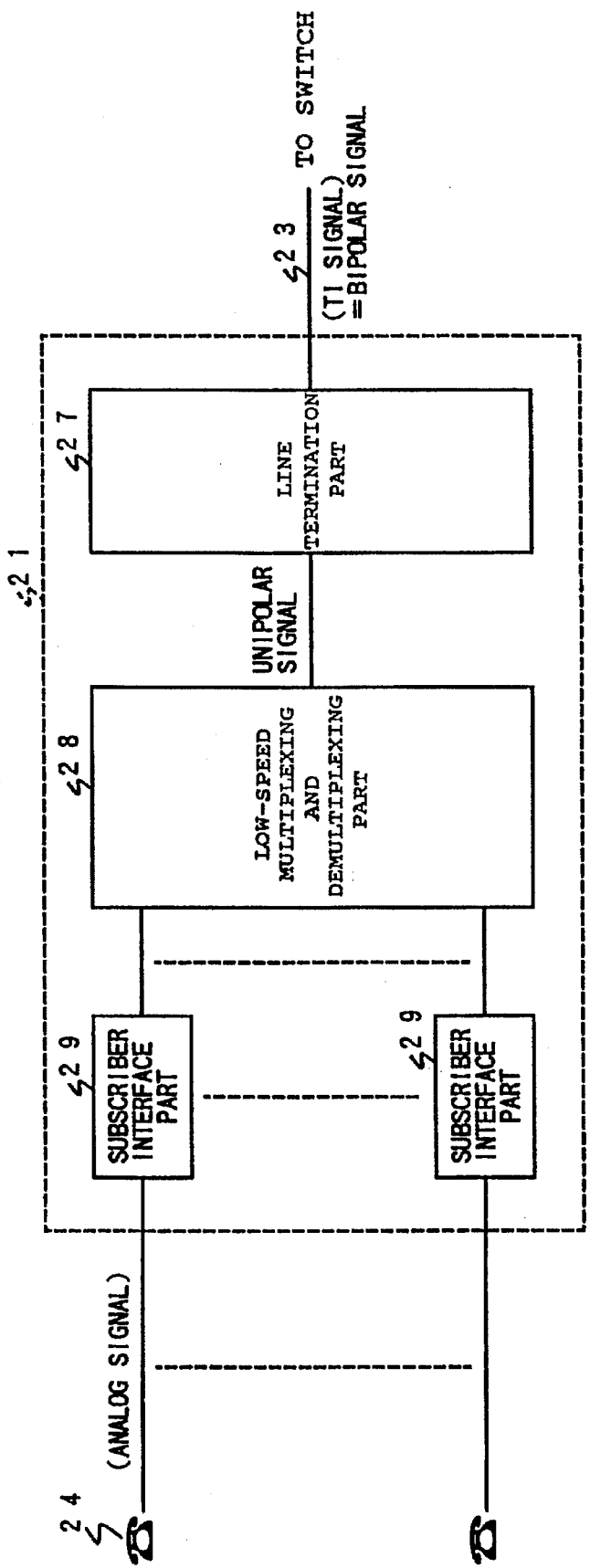
FIG. 3 is a block diagram showing the internal construction of the conventional digital loop carrier.
Figure 4:
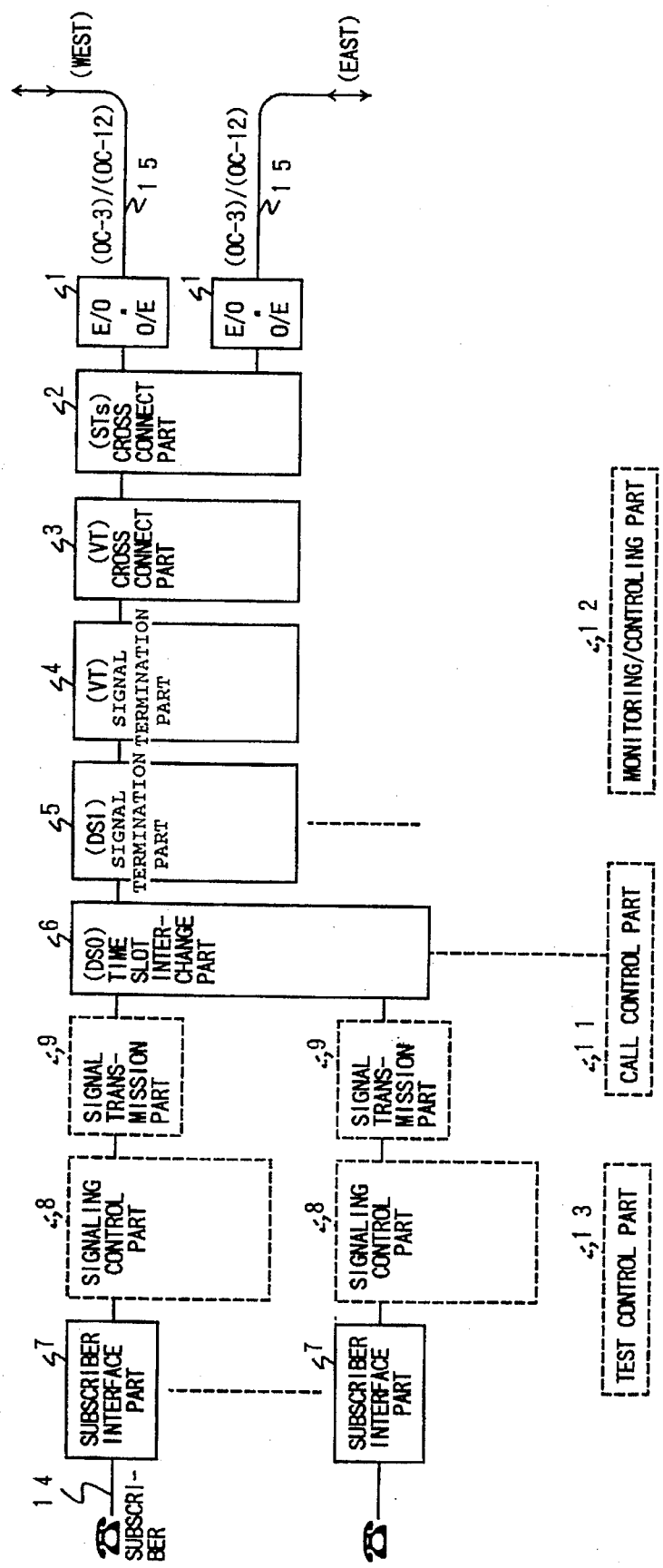
FIG. 4 is a block diagram showing the general principle of a digital loop carrier according to first embodiment of the present invention.

FIG. 4 is a block diagram showing the general principle of a digital loop carrier according to a first embodiment of the present invention.

The first embodiment of the present invention provides a digital loop carrier disposed between a switching unit and a subscriber, the digital loop carrier comprising: a high-speed optical interface part connected to an optical fiber transmission line; cross connect parts for switching, to different lines, a high-speed signal input to and output from the optical interface part, and for separating the high-speed signal to obtain a low-speed signal; signal terminal parts for separating the low-speed signal output from the cross connect part to obtain a subscriber signal; a time slot interchange part for connecting calls for each subscriber; and a interface part for performing analog-to-digital conversion and digital-to-analog conversion, and for serving as an interface for the subscriber.

In the above construction, the optical fiber transmission line may be a SONET(synchronous optical network).OC-3 (optical carrier - level 3 signal) transmission line or a SONET.OC-12 transmission line.

Further, the cross connect part of the above construction may have the function of switching an output signal from the optical interface part to 3 or 12 channels of STS1 (also referred to as STS-1) high-speed signals.

Further, the cross connect parts of the above construction may have the function of performing line switching on an arbitrary basis, obtaining 84 channels of VT1.5 low-speed signals, and switching lines for the 84 channels of VT1.5 signals.

Referring to FIG. 4, the high-speed optical interface part 1 which accommodates an optical fiber transmission line 15 installed between the switching unit (not shown) and the digital loop carrier executes the conversion between an electrical signal and an optical signal. High-speed cross connect parts 2 and 3 switches between lines carrying high-speed signals.

Preferably, the cross connect part 2 implements a cross connect for STS1 signals, and the cross connect part 3 implements a cross connect for VT1.5 signals.

Signal termination parts 4 and 5 decompose a low-speed signal output from the cross connect part 3 into a subscriber signal (DS0 signal).

A time slot interchange part 6 helps establish call connections with respect to each subscriber signal delivered from the signal termination parts 4 and 5. A subscriber interface part 7 performs analog-to-digital conversion or digital-to-analog conversion and serves as an interface for the subscriber.

Figure 5:
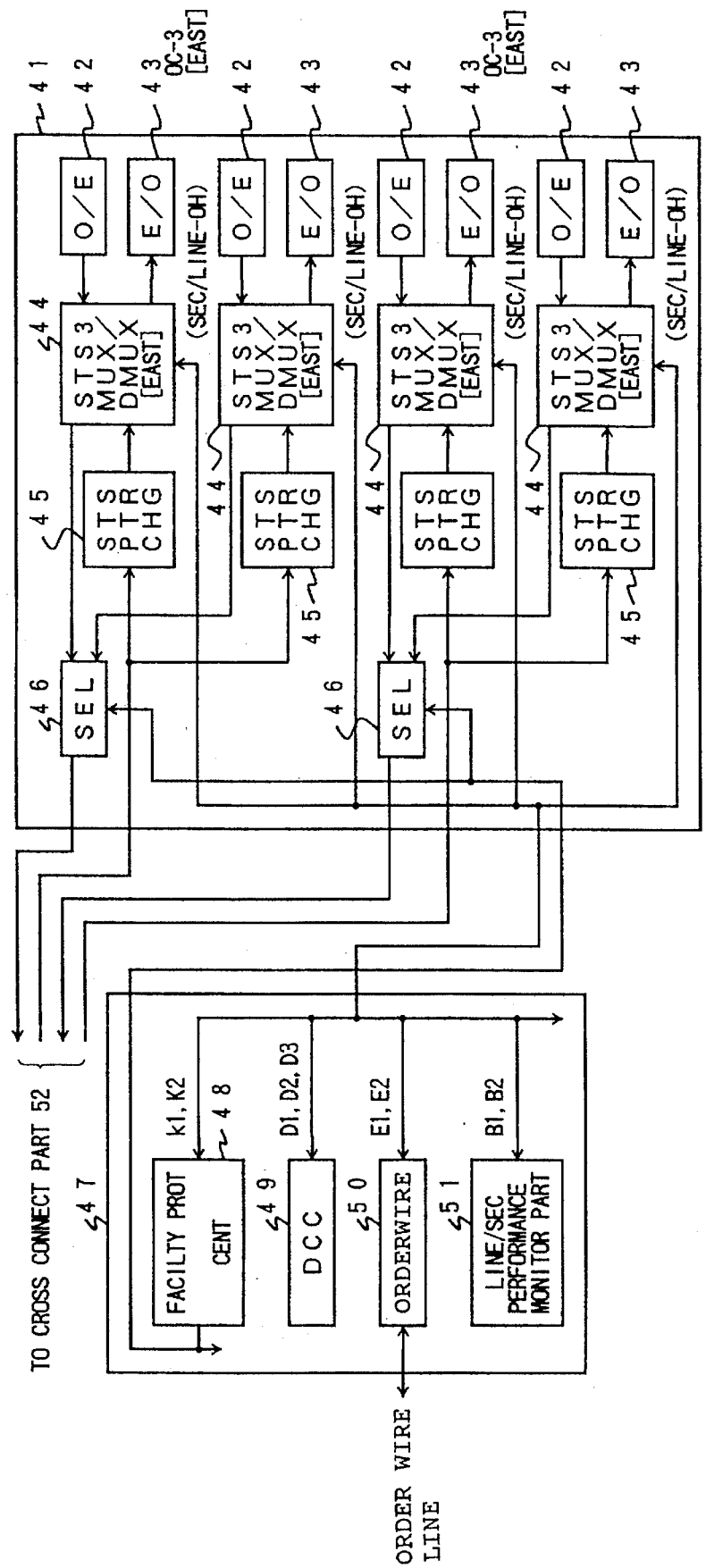
FIG. 5 is a block diagram showing an OC-3 interface part used in the digital loop carrier according to the first embodiment.
Figure 6:
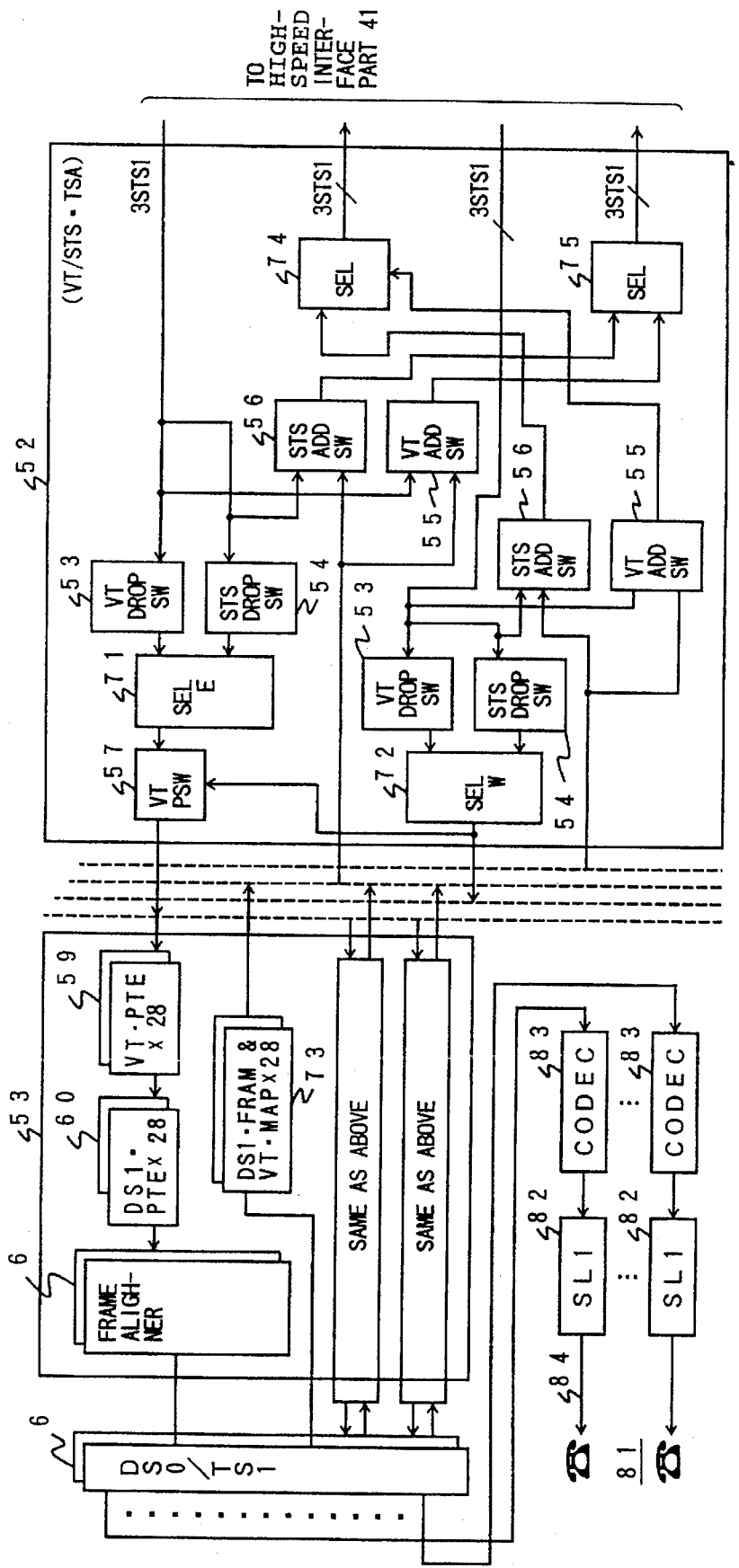
FIG. 6 is a block diagram showing a cross connect part, a signal terminal part, and a subscriber interface part used in the digital loop carrier according to the first embodiment.
Figure 7:
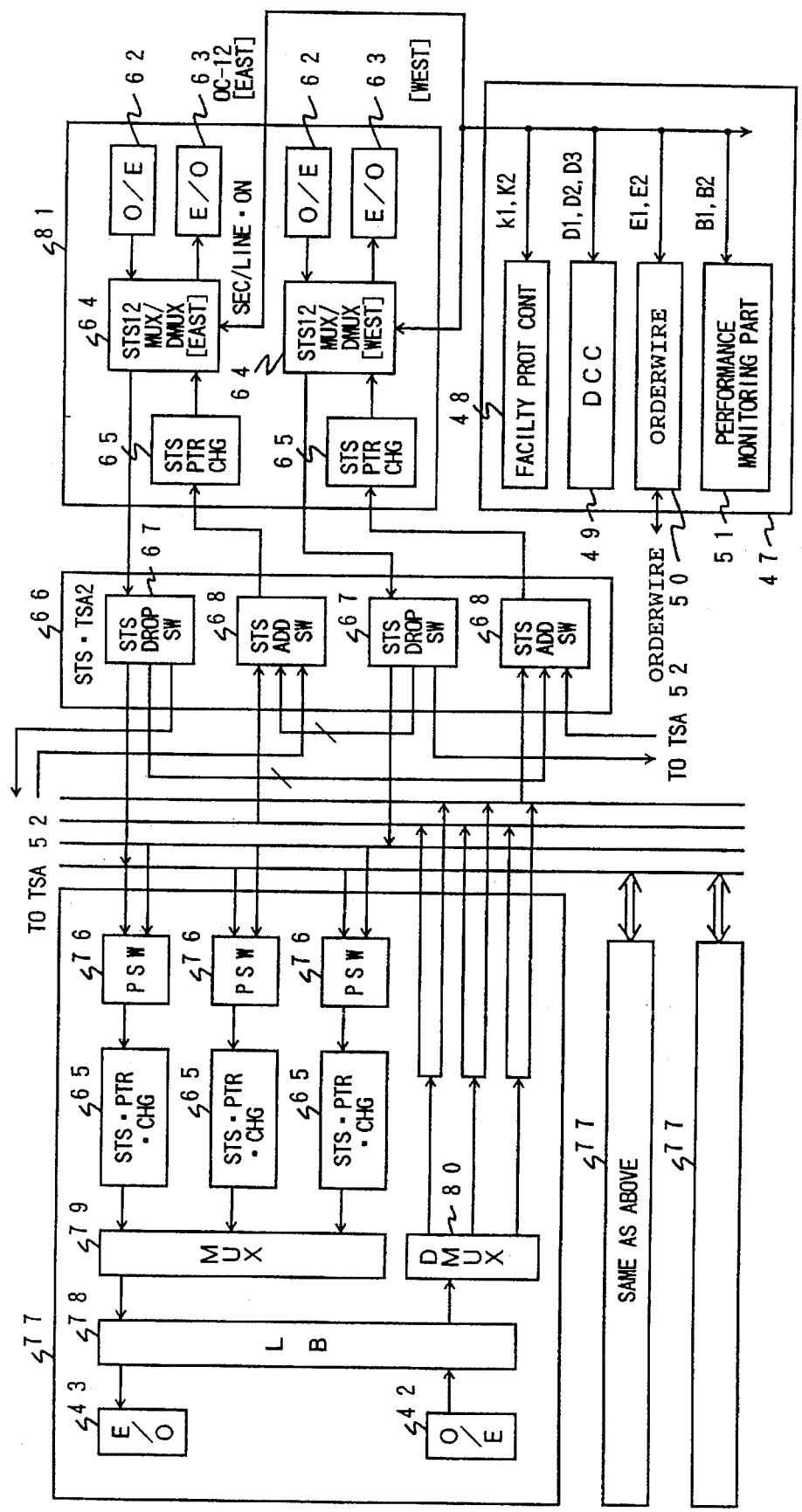
FIG. 7 is a block diagram showing an OC-12 interface part used in the digital loop carrier according to a variation of the first embodiment.

FIGS. 5, 6 and 7 show the construction of those parts that have the function of transmitting a DS0 signal via an OC-3 transmission line. Specifically, they realize the following functions: an OC-3 interface function, VT/STS (low speed/high speed).TSA (time slot assignment) cross connect function, an ADM (add-drop multiplexer) function, a VT signal termination function, a DS1 signal terminal function, and subscriber interface function.

(1) The OC-3 interface function

A high-speed signal interface part 41 shown in FIG. 5 (corresponding to the high-speed optical interface part 1 of FIG. 4) accommodates an O/E conversion part 42 for executing an optical-to-electrical conversion and an E/O conversion part 43 for executing an electrical-to-optical conversion, each of the conversion parts being connected to the OC-3 optical fiber transmission line 15 (not shown). The O/E conversion part 42 converts an optical signal into an electrical signal by means of a photodiode so as to decode the scrambled signal. The E/O conversion part 43 encodes (scrambles) the input signal and converts the scrambled signal into an optical signal by means of a laser diode. For example, the format of the optical signal is NRZ (non return to zero), the bit rate is 155.52M b/s, and the code generator polynomial is $X^7+X^6+1$.

An STS3 (also referred to as an STS-3) multiplexing/demultiplexing (MUX/DMUX) part 44 has the function of effecting frame synchronization of the STS3 signal and multiplexing/demultiplexing three channels of STS1 signals. Surplus bytes provided for the transmission line called a transport overhead are also multiplexed or demultiplexed by the STS3 multiplexing/demultiplexing part 44 for an overhead processing part 47. The transport overhead signal includes a section overhead for transmission between switching offices and a line overhead for transmission between terminal offices. Since the first embodiment concerns terminal equipment, both of the overheads are processed.

When the STS1 signal to be transmitted is multiplexed by means of the multiplexing/demultiplexing part 44 so as to produce the STS3 signal transmitted over the transmission line 15, there may be a difference between the frequencies of the signals. An STS pointer changer (PTR.CHG) 45 functions such that the difference is absorbed by a known pointer process using a stuff byte in the frame format used in the SONET. A selector (SEL) 46 is a switcher for switching the transmission lines.

The transport overhead is processed by the overhead process part 47. A transmission line switching part (FACILITY PROT CONT) 48 performs a transmission line switching control (processes of K1 and K2 bytes in the SONET frame format). A data communication channel (DCC) processing part 49 performs control/monitor data link processes (processes of D1, D2 and D3 in the SONET frame format). An orderwire processing part 50 serves as an interface for the orderwire line (performs E1 and E2 processes). A line/selection performance monitor part 51 performs transmission line quality monitoring (processes B1 and B2 bytes in the SONET frame format).

The first embodiment is configured such that four systems of OC-3 interfaces are provided and can be used appropriately depending on the network construction. As described later, the OC-3 interfaces are integrated into a network, and can be divided into an east-side duplex system and a west-side duplex system. The terms "east" and "west" are used for convenience's sake only. Each of the duplex systems is provided so as to ensure that a redundant construction (having an active system and a reserve system) results. Since the ADM (add-drop multiplexer) function has evolved to make it possible to select and set two systems of transmission paths (lines), the east system and the west system are provided accordingly.

The first embodiment is applicable to the following types of network construction; ① terminal office-terminal office (point-to-point), ② linear ADM, and ③ a ring (ADM path switch ring).

In the terminal office-terminal office network, the one system of OC-3 interface is used. In this case, the OC-3 transmission line 15 is duplexed, and one of the OC-3 interfaces in the duplex system is used in the active system and the other in the standby system. The switching of the transmission line is controlled by the transmission line control part 48 via the selector 46. Basically, in the terminal office-terminal office network, the east-side O/E conversion part 42 and the east-side E/O conversion part 43 are used.

In the linear ADM network, all of the four systems of OC-3 interfaces are utilized. The ADM function sets the destination of the signal such that either the "east" or "west" route is selected.

Both the east-side and west-side transmission lines 15 are duplexed, and the interfaces for them are provided by the duplex systems of the optical interface part 41. Switching of the transmission lines is controlled by the transmission line switching control part 48.

In the ADM ring network, one east-side system and one west-side system are employed. The ADM function sets the same route whether the east-side system is employed or the west-side system is employed. The function of switching the transmission line is not provided, and the redundancy is realized by the dynamic switching of the path (east/west) called the path switch.

(2) The VT/STS-TSA cross connect function and the ADM function

The VT/STS.TSA cross connect function and the ADM function included in the cross connect parts 2 and 3 shown in FIG. 4 are realized by a low-speed/high-speed cross connect part 52 shown in FIG. 6. The cross connect part 52 includes a switch part (VT-DROP-SW) 53 for a downstream VT signal, a switch part (STS-DROP.SW) 53 for a downstream STS signal, a switch part (VT-ADD-SW) 55 for an upstream VT signal, a switch part (STS.ADD-SW) 56 for an upstream STS signal, and a path switch part (VT.PSW) 57 for a VT signal.

In the first embodiment, the ADM function is realized in both the east side and in the west side. The ADM function with respect to the OC-3 signal capacity, that is with respect to the 3STSS1 (east)+3STS1 (east) or 84 VT (east)+84 VT (west).

The switch parts 53 and 54 have the function of selectively extracting (DROP), from the received signal, the specified VT signal and STS1 signal, respectively. The switch parts 55 and 56 have the function of selectively inserting (ADD) the VT signal and the STS signal, respectively, at specified positions. The switch part 57 has the function of switching from an abnormal VT signal to a normal VT signal when a failure has occurred in one of the VT signals in the ADM ring construction.

The switching part for the STS1 signal is also provided but not shown in FIG. 5.

The switch parts 53–56 realizes the cross connect function (TSA=times slot assignment) for VT signal units and for STS1 signal units. Selectors 71, 72, 74 and 75 selects either the VT signal or the STS signal.

(3) The signal terminal function

A VT/DS1 terminal part (path term) 58 corresponds to the signal terminal parts 4 and 5 and realizes the VT path terminal function and the DS1 path terminal function. These functions are necessary for the transmission of the DS0 signal.

In the first embodiment, the capacity of the VT path terminal function and the DS1 path terminal function is "84". A signal terminal part (VT-PTE) 59 is a VT path terminal part. In the signal terminal part 59, a VT payload is extracted from the received VT signal by means of a VT pointer, the DS1 signal being obtained as a result of removing the VT path overhead and the stuff bit.

In a DS1.FRAM&VT.MAP part 73, the VT signal to be transmitted is converted to the VT payload by inserting the stuff bit and the path overhead into the frame format. An appropriate VT pointer is added so as to fit the frequency of the STS1 signal so that the VT signal is produced.

A DS1-PTE 60 is a DS1 path terminal. In the DS1.PTE 60, the received signal is subjected to frame synchronization in accordance with the preset frame format, and the position of each DS0 signal is identified. In the DS1.FRAM&VT.MAP part 73, the DS1 signal to be transmitted is produced such that the DS0 signal is provided with a frame synchronization bit pattern according to the preset frame format. A frame aligner 61 is a memory for rearranging the received DS0 signal so as to be in a phase characteristic of the apparatus. In this apparatus, it is necessary to rearrange the DS0 signal so as to be in a phase characteristic of the apparatus so that the cross connect function for the DS0 signal units can be realized.

As shown in the figure, the signal terminal part 58 is connected to the time slot interchange part 6. The time slot interchange part 6 implements the cross connect of the DS0 signal units. Arbitrary connection of the subscriber DS0 signal and the transmission line DS0 signal is effected by changing the temporal position of the DS0 time slot by means of a time switch (T-SW). The time switch is embodied by a high-speed access memory, and the temporal position is changed by appropriately specifying a write address or a read address of this memory.

(4) The DS0 subscriber interface

In the DS0 subscriber interface shown in FIG. 6, 1920 lines of DS0 channel are accommodated. By an automatic setting of the DS0 time slot interchange (TSI) part 6, the arbitrary time slot allocation function with respect to the transmission line and the function of allocating a transmission time slot to the subscriber who has originated a call are realized.

A subscriber interface (SUBSCRIBER.INF) part 81 (corresponding to the numeral 7 in FIG. 4) is a function part serving as an interface for a subscriber line 84, and comprises a subscriber line interface circuit (SLIC) 82 and a coder/decoder signaling circuit (CODEC&SIG) 83.

The interface circuit 82 realizes a power supply function for the subscriber line 84, a function of detecting an on-hook/off-hook state of the subscriber apparatus, a call issuing function, a surge protection function, and a 2 w–4 w conversion function. The signaling circuit 83 realizes the analog audio signal-digital audio signal conversion function and the digital conversion function of the signaling.

[VARIATION OF FIRST EMBODIMENT]

FIG. 7 is a block diagram showing an OC-12 interface part used in the digital loop carrier according to a variation of the first embodiment. The transmission apparatus according to this variation has the function of transmitting the DS0 signal via the OC-12 interface. Specifically, the transmission apparatus of this variation realizes an OC-12 interface function, the cross connect function, the ADM (add-drop multiplexer) function, the VT path terminal function, and the DS1 path terminal function.

(1) OC-12 interface function

This interface function is realized by a high-speed optical interface part 81. As in the OC-3 interface part shown in FIG. 5, the interface part 81 is constructed such that an O/E conversion part 62 and an E/O conversion part 63 executes optical-electrical conversion and electrical-optical conversion, respectively. The OC-12 interface has the same function as the OC-3 interface except that the bit rate in the OC-12 interface is 622.08M b/s.

An STS12 multiplexing/demultiplexing (MUX/DMUX) part 64 has the function of effecting frame synchronization of the STS12 signal and multiplexing/demultiplexing twelve channels of STS1 signals. Surplus bytes provided for the transmission line called a transport overhead are also multiplexed or demultiplexed by the STS12 multiplexing/demultiplexing part 64. The process with respect to the transport overhead and the process executed by an STS pointer changer (PTR.CHG) 65 are the same as those of the corresponding processes, indicated in FIG. 5, of the OC-3 signal.

The OC-12 interface described above is applicable to a network construction called a path switch ring. In this case, one of the east-side system and the west-side system of the OC-12 interface is used. The ADM function sets the route whether the east-side system is used or the west-side system is used. The function of switching the transmission line is not provided, and the redundancy is realized by the dynamic switching of the path (east/west) called the path switch.

In the case of the OC-12 interface, there are plurality of switch parts (DROP.SW) for a downstream STS signal and a plurality of switch parts (ADD.SW) for an upstream STS signal. This comes from the construction of the transmission apparatus of this variation, in which the ADM function is realized for both the OC-3 interface and the OC-12 interface, and in which, accordingly, the ADM function (the VT/STS cross connect part 52 shown in FIG. 6) for the capacity of OC-3 is shared by the OC-3 interface and the OC-12 interface, by providing the ADM function (an STS cross connect part 66 shown in FIG. 7) having capacity for the OC-12 interface is provided. Therefore, for the sake of simplicity of the drawings, the VT/STS cross connect part (TSA) 52 is not shown in FIG. 7.

(2) Cross connect function and ADM function

The cross connect function and the ADM function are realized such that switch parts 67 and 68 of the cross connect part (TSA2) 66 shown in FIG. 7 set routes for each STS signal unit. Routes are set for signals accommodated in the ADM function part, having the capacity of 3STS1 (east)+ 3STS1 (west), indicated by the VT/STS cross connect part 52 in FIG. 6, or in an OC-3 low-speed interface part 77.

Specifically, the OC-3 low-speed interface part 77 may be set for the 12STS1 signal in the OC-12 when the application specifies that the transmission apparatus including the OC-12 interface according to this variation be connected to a remote station. The VT/STS cross connect part 52 (FIG. 7)

may be set for the 12STS1 signal when the transmission is terminated by the DS0 service.

The selection of the routes is effected by the STS cross connect part 66. In the case of the DS0 service, the route selection is executed for the VT signal units by means of the VT/STS cross connect part 52.

The OC-3 low-speed interface part 77 switches (selects) between STS1 signals from the STS cross connect part 66 by means of a path switch part 76. The STS pointer changer part 65 executes the pointer process. A multiplexing part (MUX) 79 multiplexes three channels of STS1 signals, the E/O conversion part 43 performs an electrical-optical conversion and outputs the conversion result in the OC-3 signal format. The OC-3 input signal, on the other hand, is subjected to optical-electrical conversion by the O/E conversion part 42. The demultiplexing part (DMUX) 80 demultiplexes the resultant signal to obtain three channels of STS1 signals, which are then input to the STS cross connect part 66.

The VT path terminal function and the DS1 path terminal function are the same as the corresponding functions of the OC-3 shown in FIG. 6.

According to the digital loop carrier of this and the other embodiments of the present invention, it is possible to transmit a large quantity of digital signals. The present invention makes it possible to adapt the transmission apparatus, without installing optical terminal equipment between the exchange and the remote station, to services that are expected to be used more extensively in the ordinary household in the future; the services including a digital signal service such as the ISDN, an image service such as the one dealing with video images, and a broadband transmission service using a DS1 signal, a DS3 signal or an OC-3 signal.

Furthermore, connection, as well as the modification thereof, of wires adapted to the DS1 signal level (1.5M b/s) and the DS0 signal level (64K b/s) can be automatically and easily performed.

[SECOND EMBODIMENT]

Figure 8:
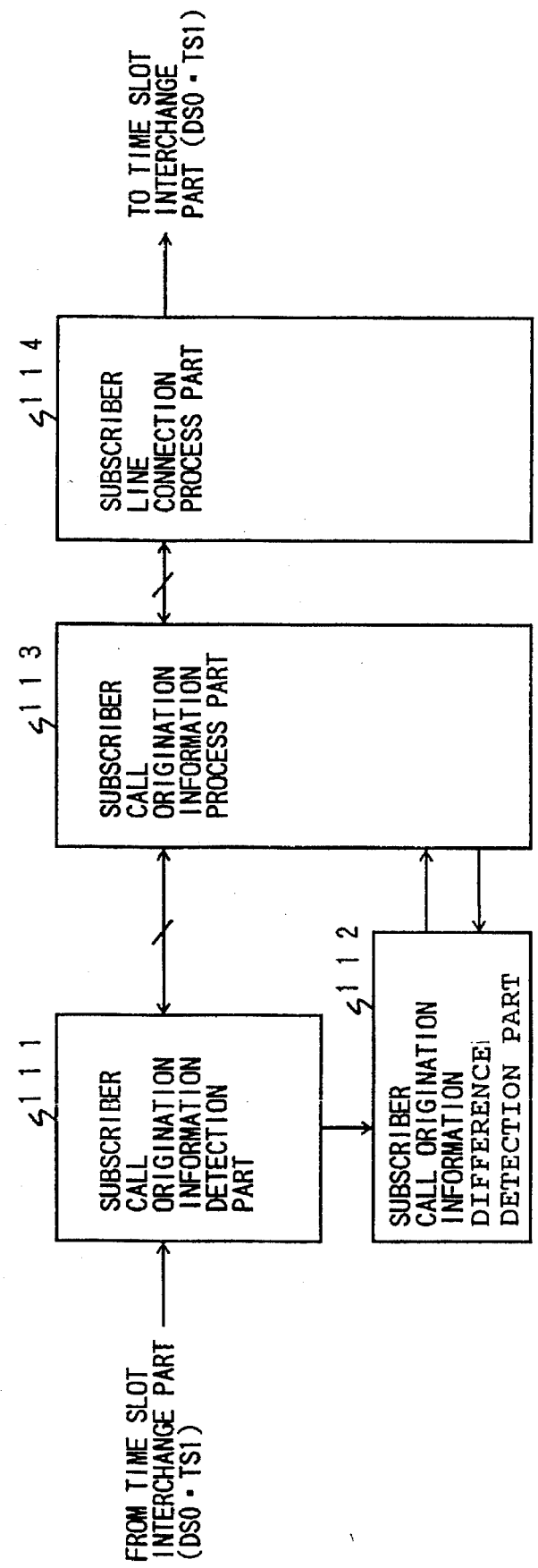
FIG. 8 is a block diagram showing the principle and construction of a call control part of the digital loop carrier according to a second embodiment of the present invention.

FIG. 8 is a block diagram showing the principle and construction of a call control part of the digital loop carrier according to a second embodiment of the present invention.

The second embodiment of the present invention provides a digital loop carrier, wherein a call control part is connected to the time slot interchange part, the call control part comprising: a subscriber call origination information detection part for detecting latest subscriber call origination information; a subscriber call origination information variation detection part for comparing, for the same subscriber, the current call origination information with the immediately preceding call origination information so as to detect a difference, and for detecting whether or not a call has been issued from the subscriber or whether or not a call origination has been completed; a subscriber call origination information processing part for identifying the subscriber corresponding to the difference, and for issuing a subscriber time slot connection/release request to the switching unit; a subscriber line connection processing part for connecting, after the request is issued to the switching unit, the subscriber to the time slot specified by the switching unit.

In another variation of the construction of the second embodiment, the subscriber call origination information detection part includes a subscriber information NEW register which stores latest subscriber call origination information, the subscriber call origination information variation detection part includes a subscriber information NEW-1 register which stores the call origination information, and the subscriber call origination information processing part compares the contents of the NEW register and the NEW-1 register so as to subject the comparison result to software process and to use the comparison result to update the content of the NEW-1 register.

In still another variation of the construction of the second embodiment, the subscriber call origination information detection part 111 divides subscriber information into blocks so as to deal with a case where the amount of information for each subscriber is large, and provides the latest subscriber call origination information to the subscriber call origination information variation detection part in units of blocks.

In still another variation of the construction of the second embodiment, the subscriber call origination information detection part rearranges the subscriber call origination information by converting the subscriber call origination information into the same arrangement as the format of the data area of the command provided according to a predetermined standard, so that the call origination information can be transmitted to the appropriate switching unit without converting the format of the call origination information.

In still another variation of the construction of the second embodiment, the subscriber call origination information detection part makes it appear that the call origination/call termination information of a non-concentration subscriber always indicates a call origination state, even when the concentration service and the non-concentration service coexist, so that the non-concentration service can be processed in the same manner as the concentration service.

The call control part 11 shown in FIGS. 4 and 8 is configured such that a subscriber call origination information detection part 111 detects latest subscriber call origination information. A subscriber call origination information variation detection part 112 monitors the change in the state of the subscriber. The monitoring of the change is executed by detecting the difference between the current call origination information as detected by the subscriber call origination information detection part 111 with the last call origination information from the same subscriber. Thus, a determination is made as to whether or not a call is originated by the subscriber and whether or not the call origination is completed.

A subscriber call origination information processing part 113 identifies the subscriber corresponding to the difference, and issues a request for connecting the subscriber to or releasing the subscriber from a time slot, to the switching unit (not shown) via the time slot interchange part 6. A subscriber line connection processing part 114 controls the time slot interchange part 6 after the request to the exchange has been issued so that the subscriber is connected to or released from the time slot specified by the exchange.

The time slot interchange part 6 notifies the exchange of the control of the subscriber line connection processing part 6, and connects the DS0 time slot in accordance with an instruction from the exchange. When a call has been completed, the time slot interchange part 6 receives an instruction form the exchange via the data link and releases the DS0 time slot.

In the present invention, the subscriber call origination information detection part 111 and the subscriber call origination variation detection part 112 are constructed by hardware means, and the subscriber call origination information processing part 113 is constructed by software means. In this way, the hardware processing function and the software processing function are separated from each other.

While the conventional method, whereby the software is interrupted by subscriber call origination information on a regular basis, an inconsistency is created between the hardware call origination information and the software call information, the call origination information detected by the hardware and the call origination information in the NEW register provided in the software are always made to be identical in the present invention.

Further, the subscriber call origination information detection part 111 divides the subscriber information into blocks, and supplies the subscriber call origination information block wise to the subscriber call origination information variation detection part 112 so as to be able to deal with the case where the information for each subscriber is large.

The subscriber call origination information detection part 111 is capable of rearranging the subscriber call origination by converting the same to have the same arrangement as the data area format of the command provided according to the standard, so that the information can be transmitted to the switching at the other end unit without performing a format conversion.

The line connection process of this system is designed for the concentration subscriber. As a measure to deal with a case where there is a non-concentration subscriber in the same system, it is stipulated that the non-concentration subscriber (dedicated line subscriber) is always connected to the line irrespective of the subscriber call origination information state detected by the subscriber call origination information part 111. The non-concentration subscriber is made to appear to the subscriber call origination information detection part 111 as being always busy irrespective of the call origination state of the subscriber, and can be dealt with by means of the same line connection process (i.e. identification of an idle or busy state) as the concentration subscriber.

[VARIATION OF SECOND EMBODIMENT]

Figure 9:
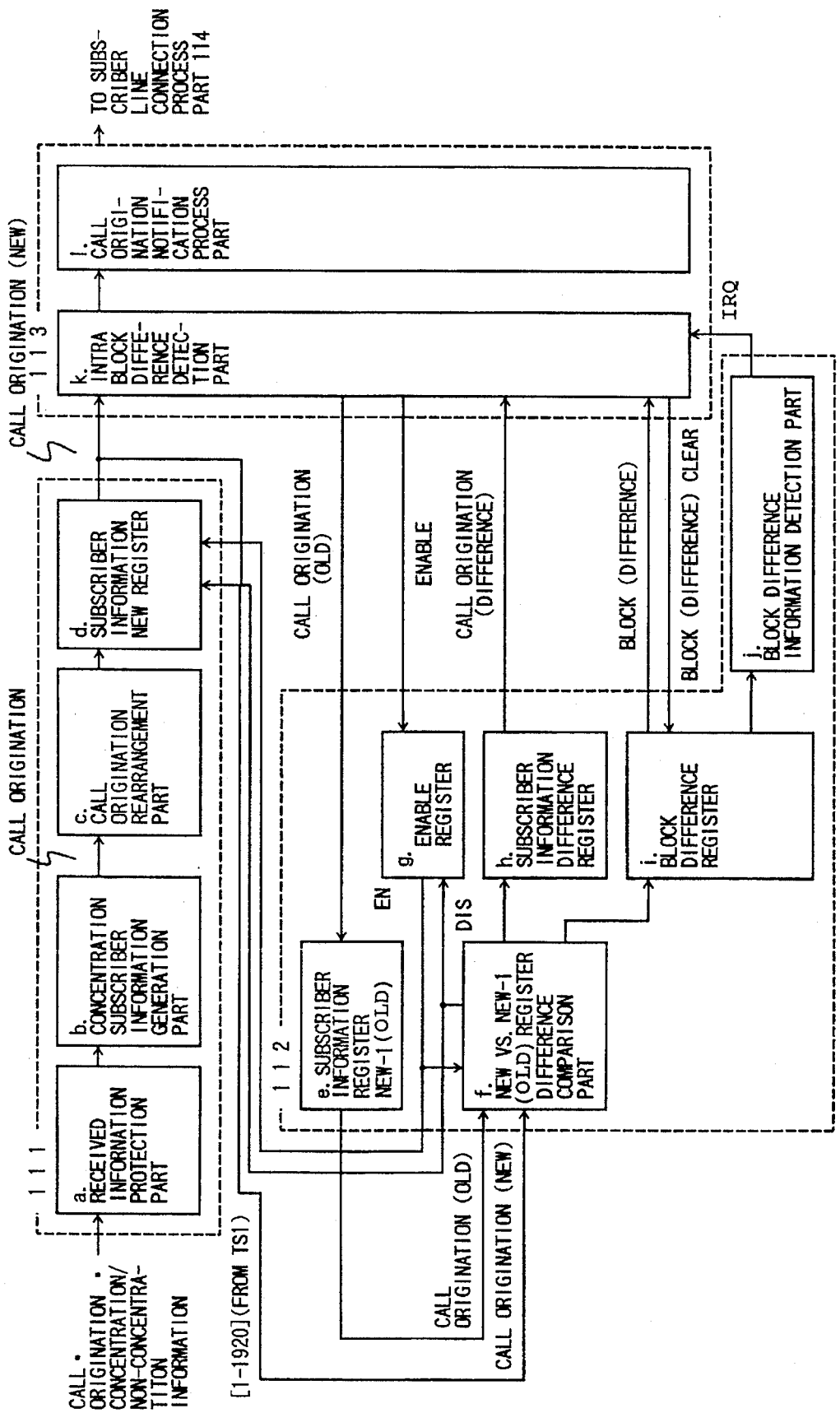
FIG. 9 is a block diagram showing the call control part used in the digital loop carrier according to a variation of the second embodiment.

FIG. 9 shows a call control part 11 in the digital loop carrier according to a variation of the second embodiment. The subscriber call origination information detection part 111 of this variation comprises a reception information protection part (a) for sequentially processing the call origination and concentration/non-concentration signal from the time slot interchange part 6, a concentration subscriber information generation part (b), a call origination rearrangement part (c), and a subscriber information NEW register (d).

The subscriber call origination information variation detection part 112 comprises a subscriber information NEW-1 register (e), a register difference comparison part (f) connected to the NEW-1 register (e) and the NEW register (d), an enable register (g) connected to the NEW register (d) and the comparison part (f), a subscriber information difference register (h) which receives the output signal of the comparison part (f), a block difference register (i), and a block difference information detection part (j) which receives the output signal from the register (j).

The subscriber call origination information processing part 113 comprises: a intra-block difference determining part (k) connected to NEW-1 registers (e), (d), and (g)–(i) and to the detection part (j); a call origination notification processing part (l) which performs a known process for notifying the subscriber line processing part 114 of the call origination in response to the output signal from the determining part (k).

Schematically, the subscriber call origination information detection part 111 detects whether the subscriber call origination information indicates busy or idle. The subscriber call origination information variation detection part 112 detects whether or not there is a change in the call origination information detected by the subscriber call origination information detection part 111. When it is determined that there is a change, an IRQ (interrupt) is generated in units of blocks (for 48 subscriber minute), thereby prohibiting the subscriber call origination information detection part 111 from taking new subscriber information until there occurs, in the subscriber call origination information processing part 113, a corresponding EN (take enable) signal in units of blocks.

The subscriber call origination information processing part 113 determines which subscriber, of the block for which an IRQ has been generated from the subscriber call origination information variation detection part 112, has issued a call, and provides the identity of the subscriber to the subscriber line connection processing part 114. When the line connection process for the subscriber by the processing part 114 is completed, an enable signal EN is delivered to the subscriber call origination information variation detection part 112. The processing part 114 establishes connection of the line according to a protocol prescribed for the transmission between the switching unit (not shown) and the transmission apparatus.

In the above construction, only the determining part (k) in the subscriber call origination information process part 113 and the processing part (l) are constructed by software means.

A description will now be given of the operation of the above construction with reference to the hardware/software flow chart shown in FIG. 10.

First, the reception information protection part (a) in the subscriber call origination information detection part 111 protects against the reception error that may occur when the subscriber-wise call origination and the information relating to the concentration/non-concentration (dedicated line) are received from the DS0 signal time slot interchange part 6.

The subscriber information generation part (b) generates, on the basis of the information indicating the concentration or the non-concentration, the call origination information "BUSY" in correspondence with the non-concentration subscriber, and generates the call origination information "IDLE" or "BUSY" in correspondence with the concentration subscriber.

The subscriber information generation part (b) forwards the call origination information "BUSY" or "IDLE" of the concentration subscriber as it is to the next stage of the circuit, and forwards the call origination information "BUSY" of the non-concentration subscriber irrespective of the call origination states of the non-subscriber, because it is always necessary to perform the line connection process irrespective of the IDLE/BUSY call origination state. In this way, the subscriber call origination information detection part 111 is able to perform the process based on the binary states of BUSY and IDLE, without regard to the concentration/non-concentration distinction.

The call origination rearrangement part (c) converts the call origination information to fit the system configuration of the predetermined standard (for example, the American TROO8 MODE2 system standard), and converts the BIT arrangement to fit the data arrangement of time slot assign request command of the protocol effective between the transmission apparatus and the switching unit.

Although line connection process is designed for the concentration subscriber, a non-concentration subscriber and a concentration subscriber may coexist within the same system. It is stipulated that the non-concentration subscriber be connected to the line irrespective of the subscriber call origination information. The non-concentration subscriber can be processed in the same line connection process as the concentration subscriber by making it appear to the subscriber call origination information detection part 111 that the call origination information for the non-concentration subscriber is always "BUSY" irrespective of the actual call origination state. In another words, the subscriber call origination information detection part 111 is able to perform the process based on the binary states of BUSY and IDLE, without regard to the concentration/non-concentration distinction.

The subscriber information NEW register (d) stores, in units of blocks, the latest call origination information generated for each subscriber only when the enable signal is provided in units of blocks from the enable register (g). When a disable signal is received from the NEW register—NEW-1 register difference comparison part (f), the subscriber call origination information detection part 111 is prohibited from taking new subscriber call information.

The subscriber information NEW-1 register (e) in the subscriber call origination information variation detection part 112 stores the call origination information that immediately precedes the latest call origination information so that the difference can be detected, the storing being done for each subscriber in units of blocks as in the subscriber NEW register (d).

Figure 10:
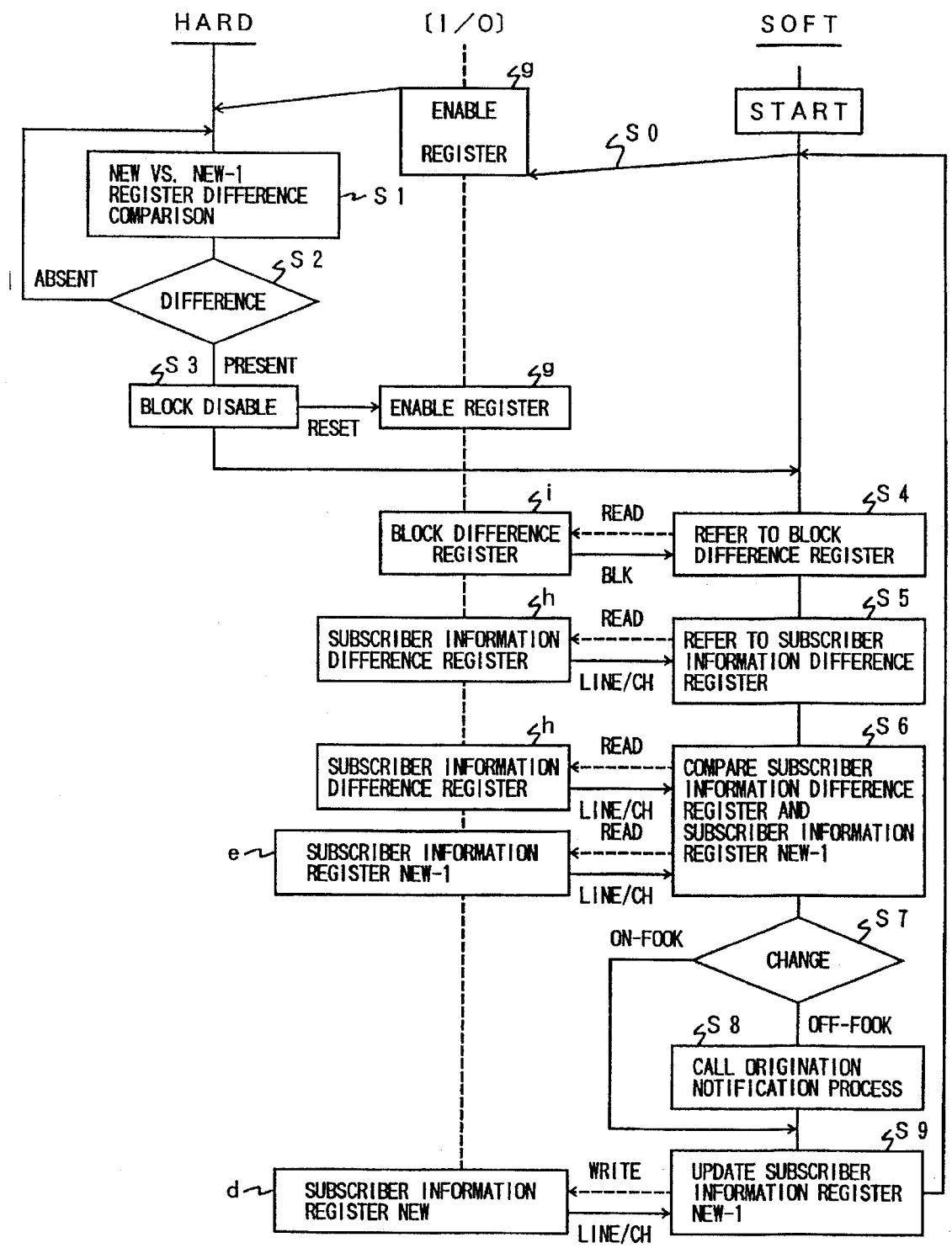
FIG. 10 is a flow chart showing the hardware/software operation of the call control part used in the digital loop carrier according to the second embodiment.

The register difference comparison part (f) outputs the difference between the content of the NEW register (d) and the content of the NEW-1 register (e) (step S1 of FIG. 10). The comparison part (f) is triggered by an enable signal received in units of blocks from the intra-block difference determining part (k) via the enable register (g), so as to make a block-for-block comparison for each subscriber between the latest (active) subscriber call origination information and the call origination information that immediately precedes it and to determined whether or not there is any difference therebetween (step S2).

The subscriber call origination information detection part 111 is notified of the identity of each of the subscribers for which a difference has been detected (i.e., the subscriber from which a call is originated or a subscriber whose call origination has been completed), in the same format as the one employed in the NEW register (d). A block for which the process is completed is put into a disable state, and the corresponding block in the register (g) is reset (step S3).

The enable register (g) is a register which receives an enable signal for each block from the intra-block difference determining part (k) by software means (step S0). Further, the enable register (g) delivers the enable signal to the comparison part (f) and the register (d).

The subscriber information difference register (h) receives the difference information for the subscriber in which a difference is detected from the comparison part (f), stores the difference information in units of blocks as in the case of the register (d). The intra-block difference determining part (k) refers to the content of the register (h) (step S5).

The block difference register (i) stores the difference information for the block in which there is a difference. The determining part (k) determines, by software means, the difference information of the block in which the subscriber call origination information process is completed (step S4). The register (i) is cleared, and the IRQ (interrupt) factor (notification signal indicating an occurrence of a change) is reset.

The block difference information detection part (j) receives, from the register (i), the difference information of the block in which a difference is detected, and subjects information to the logical sum process. When there is a change detected, a determination that the IRQ factor (notification signal indicating an occurrence of a change) is made so that the intra-block difference determining part (k) is notified.

The intra-block difference (call origination) determining part (k) enables, by software means, the register (f) in units of blocks via the register (g) (step S0). When a change is detected in any of the blocks on the basis of the IRQ factor determination by the detection part (j), the identity of the block in which there is a change is determined in reciprocating processes between the intra-block difference determining part (k) and the block difference register (j) (steps S4, S6). The registers (h) and (d) determines in which subscriber a change has occurred (IDLE→BUSY) (step S7), and notifies the call origination notification process part (l) of the identity of the subscriber (step S8).

Paralleling the above processes, the corresponding subscriber information in the register (e) is modified (step S9) in a similar manner. Further, when all the subscribers for which there is a change in the block have been processed, the corresponding blocks in the block difference register (i) are cleared. Similar processes are repeated block-for-block until there is no IRQ factor.

When the information for all the subscribers for which there is a change have been processed, the comparison part (f) is enabled so that the similar processes are repeated. The call origination notification process part (l) controls the protocol for the switching unit with respect to the subscriber (call origination) information delivered from the intra-block difference (call origination) determining part (k).

FIG. 11 shows an example of the connection between the call control part 11 and the DS0 time slot interchange part (TS1) 6 shown in FIG. 4.

The time slot interchange part 6 achieves arbitrary connection between the subscriber DS0 and the transmission line DS0 by rearranging the temporal position of the DS0 time slot using the time switch. This time switch is realized by a high-speed access memory (not shown). An address control memory (hereinafter, simply refereed to as the ACM) addresses this memory.

The ACM stores as data the time switch write and read addresses corresponding to necessary connection arrangements. In accordance with this data, the addressing for the time switch reading is sequentially performed.

The writing of data to the ACM is executed by a control part 95. The control part 95 comprises three stages of ACM: namely, a subscriber line connection ACM (SUBSCRIBER ASSIGN ACM) 91; a superior transmission line connection ACM (FEEDER ASSIGN ACM) 92 for controlling the connection configuration of the transmission line DS0; and an R-DT configuration ACM (RDT ASSIGN ACM) 93 for controlling the configuration of the connection between the subscriber DS0 and the transmission line DS0.

The subscriber line connection ACM 91 and the superior transmission line connection ACM 92 are set statically. The R-DT configuration ACM 93 may be set statically or set dynamically in response to the subscriber call origination. This dynamic setting is also called dynamic assignment and is controlled by the call control part 11.

According to the call control part of the second embodiment, the flexibility of the concentration function is not restrained, and the number of channels projected for concentration can be increased.

[THIRD EMBODIMENT]

Figure 12:
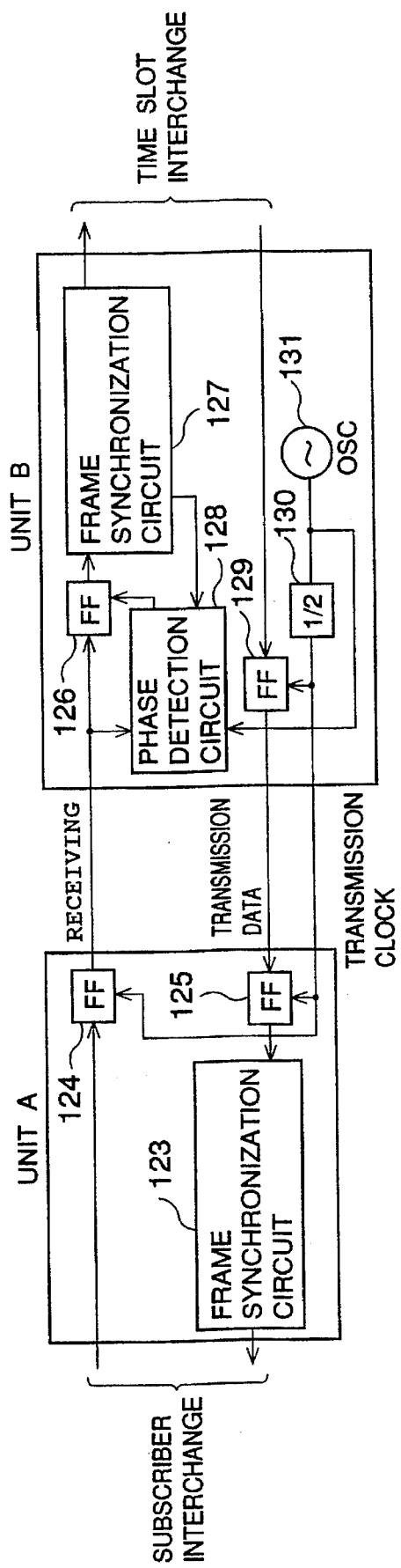
FIG. 12 is a block diagram showing the principle and construction of a signal transmission part of the digital loop carrier according to a third embodiment.

FIG. 12 is a block diagram showing the principle and construction of a signal transmission part of the digital loop carrier according to a third embodiment.

The third embodiment of the present invention provides a digital loop carrier comprising a signal transmission part formed of two units provided between the time slot interchange part 6 and the subscriber interface part, a first unit comprising means for generating a transmission clock and means for sending the transmission clock and transmission data synchronized to the transmission clock, a second unit comprising means for receiving the transmission data in accordance with the transmission clock and means for transmitting reception data in synchronization with the transmission clock, wherein the first unit further comprises means for generating a clock having double the frequency of the transmission clock, means for detecting the phase of the reception clock of the reception data in accordance with the clock having double frequency, and means for receiving the reception data in accordance with the reception clock.

Referring to FIG. 12, the transmitted data is sent from a means 129 (for example, a flip-flop) of a first unit B to a second unit A in response to a transmission clock generated by a means 131. A means 125 (for example, a flip-flop) of the second unit A receives the data in response to the transmission clock.

The transmission clock is supplied to a means 124 (for example, a flip-flop), and the means 124 sends the received data (12.352 MHz) from the second unit A to the first unit B. This data is completely synchronized to the clock sent by the first unit B in its bit rate, but the phase thereof becomes indeterminate due to the delay caused by elements (for example, the gate, the line driver, or the receiver) for carrying the clock or the data.

Therefore, the first unit B determines the phase of the data received by the means 128 so as to determine the phase of the clock taken in by a means 126 (for example, a flip-flop). In order to determine the data phase, it is necessary to detect the data phase. Since the bit rate of the data is the same as the clock (master clock) having twice the speed of the transmitted clock from the first unit B, this clock is utilized in detecting the phase of the received data so that the reception clock for punching the data can be determined.

In this way, only the transmission clock is needed between the unit A and the unit B. The signal line for the reception clock is unnecessary because the reception clock for the received data is generated in the unit B. As the number of subscriber interface parts increase, the number of signal lines for the reception clock becomes great, thus leading to the increase of the circuit scale.

A means 127 detects the frame misalignment in the data received by the means 126, and re-hunting of the clock phase is done by providing the frame misalignment to the means 128.

FIG. 13 is a circuit diagram showing an embodiment of the phase detection circuit 128 shown in FIG. 12. The phase detection circuit 128 comprises a data phase detection part 121, JK-FFs 121a and 121b, a reset pulse generation part 122, and multivibrators 122a and 122b.

The two JK-FFs 121a and 121b regenerate the reception clock on the basis of the H→L change of the received data (DATA), using the clock having twice the speed of the reception data. A D-FF 121c is reset when a clear signal is supplied to a CLR terminal thereof. The JK-FFs 121a and 121b are cleared then. The multivibrators 122a and 122b generate the clearing pulses.

The phase detection circuit 128 also comprises inverters INV1 and INV2, NAND gates NAND1–NAND5, AND gates AND1–AND3, resistances R1–R4, and capacitors C1–C3.

Figure 14:
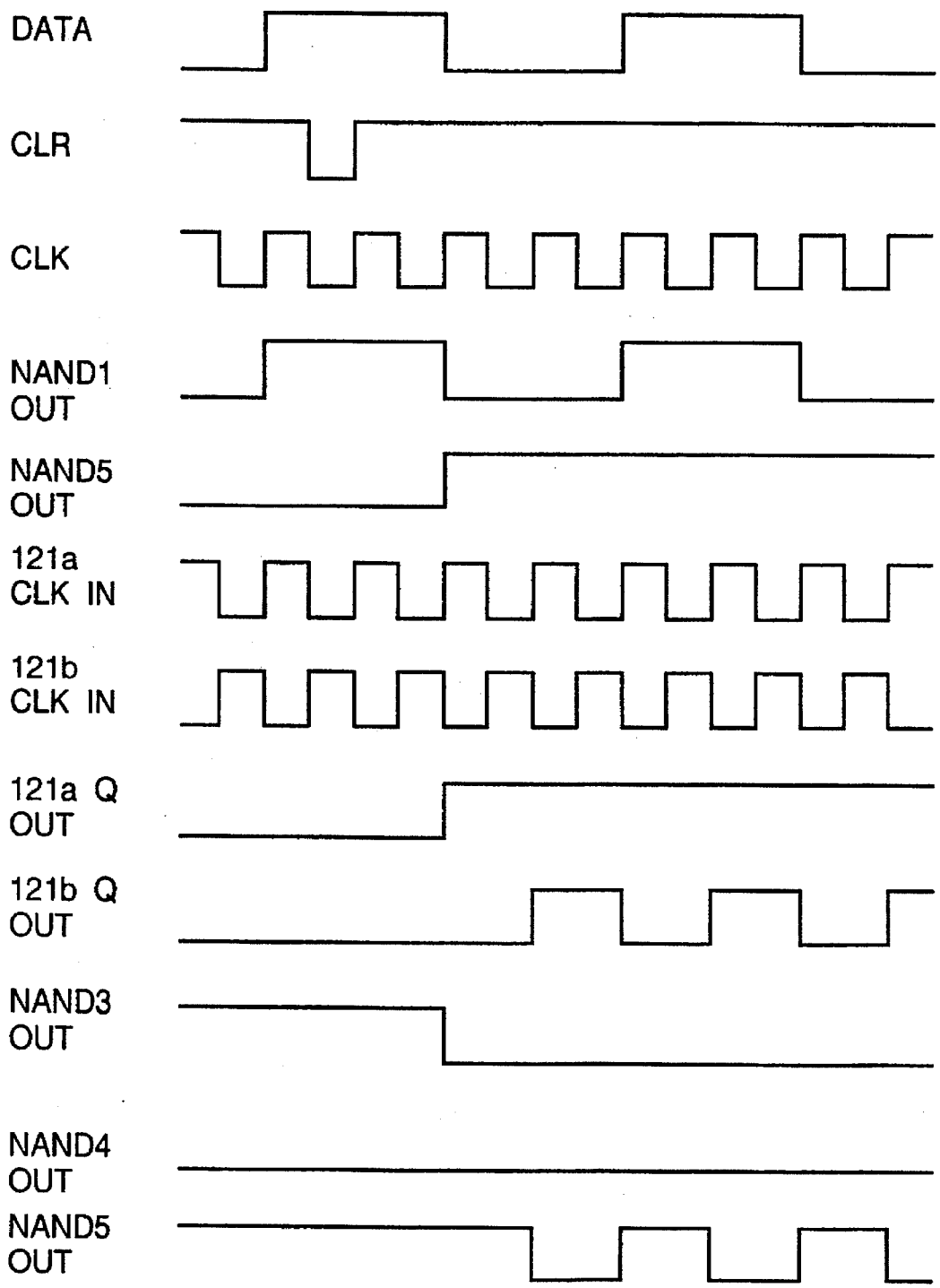
FIG. 14 is a time chart showing the operation of the phase detection circuit in the signal transmission part used in the digital loop carrier according to the third embodiment.

A description will now be given, with reference to time chart shown in FIG. 14, of the operation of the phase detection circuit 128.

When the frame synchronization circuit 127 detects a frame misalignment, and the detection signal is supplied as a clear signal from the multivibrator 122a, the D-FF 121c is reset, and the two JK-FFs 121a and 121b are cleared. Since the Q output of the JK-FFs are at an L level, the S-R latch circuit formed of the gate NAND3 and the gate NAND4 have both the output thereof at an H level, and the K input thereof is at an H level. Since the inverted Q output of the two JK-FF 121a and 121b is at an H level, the gates of the gate NAND1 and the gate NAND2 are open so that the signal can pass therethrough.

Due to the H→L data transition, the D-FF 121c is activated and the output thereof becomes set at an H level. The clear signals to the JK-FFs 121a and 121b are released. The two JK-FFs 121a and 121b receive the input of a 24 MHz clock and a reversed clock thereof, respectively. Accordingly, the two JK-FFs 121a and 121b operate such that there is a half-clock shift (20 ns) in the phases thereof.

When the clear signals from the reset pulse generation part 122 are released, the J input of the JK-FFs is at an L level if the data is at an L level, and the output of the JK-FF remains at Q=L.

When the data becomes set at an H level, the J input becomes set at an H level. The JK-FFs 121a and 121b begin togging operations. The output Q goes through an L→H→L cycle of level change. The first one of the two JK-FFs 121a and 121b which has its J input shifted to an H level has its Q output shifted to an H level. For example, when the JK-FF121a first begins a togging operation, the gate NAND3 output of the S-R latch circuit becomes set at an L level.

The output of the gate NAND3 prompts the K input of the JK-FF 121a to be at an L level with the result that the JK-FF 121a stops its toggling operation and the Q output thereof becomes fixed at an H level.

On the other hand, the K input of the JK-FF 121b becomes set at an H level and the gate (NAND2) input of the J input becomes set at an L level, the J input becomes fixed at an H level, and the toggling operation is continued.

The input of the gate NAND5 is fixed at an H level on the JK-FF 121a side, and the input of the gate NAND5 repeats a cycle L→H→L→H on the JK-FF 121b side. The output is then inverted, and the resultant output CLK-OUT is supplied to the FF 126 as a data punching clock.

When the clear terminal CLR of the D-FF 121c becomes set at an L level, the two JK-FFs 121a and 121b are cleared, and the operation thereof is stopped. The JK-FF 121a and 121b are then in a stand-by state in which they wait for a data edge.

According to the signal transmission part of this embodiment, only a transmission clock is required between units, and a signal line for a reception clock can be omitted because one of the units regenerates the reception clock for the received data. Therefore, the circuit scale can be reduced.

[FOURTH EMBODIMENT]

Figure 15:
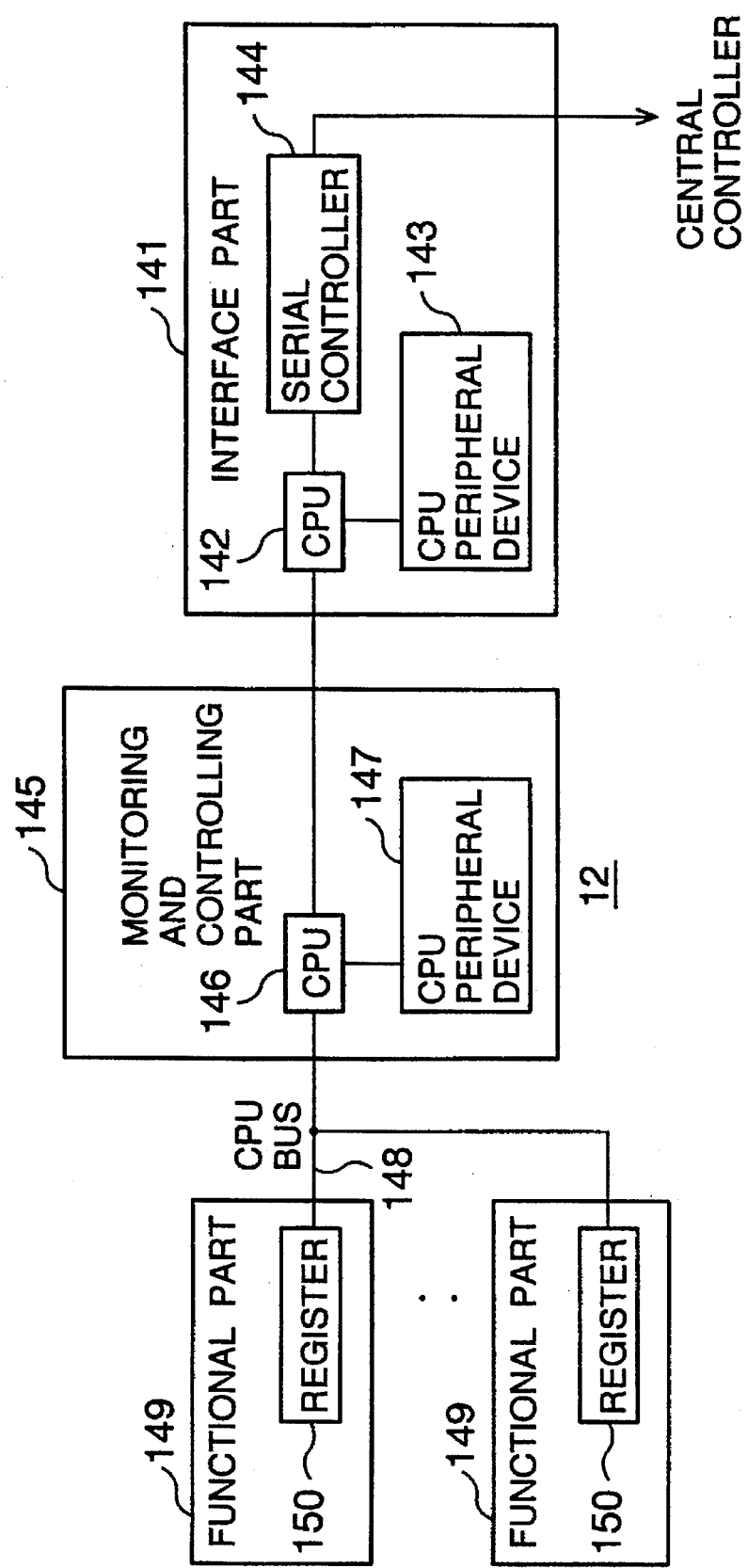
FIG. 15 is a block diagram showing the principle and construction of a monitoring and controlling part of the digital loop carrier according to a fourth embodiment.

FIG. 15 is a block diagram showing the principle and construction of a monitoring and controlling part of the digital loop carrier according to a fourth embodiment.

The fourth embodiment of the present invention provides a digital loop carrier, the digital loop carrier further comprising: functional part for collecting alarm information and apparatus operation information within the digital loop carrier; apparatus monitoring and controlling part for setting an apparatus operation mode and for controlling the operation of the functional part; and monitoring and controlling part equipped with an interface for exchanging information with a controller in the network.

Referring to FIG. 15, an interface part 141 is mainly formed of a CPU 142, a peripheral device 143 and a serial controller 144. The interface part 141 supports the LAPD protocol, generates/decodes the communication message sent to and received from a controller, and exchanges information with the monitoring and controlling part 145.

The monitoring and controlling part 145 is mainly formed of a CPU 146 and a peripheral device 147. A CPU bus 148 extends to functional parts 149. Information collecting from the functional parts 149 and the control thereof are effected through a register 150 disposed in each of the functional parts 149.

By using the overhead signal of the SONET, etc. in the network, it is possible to communicate with a remote controller. By employing the LAPD protocol, the monitoring and controlling of a plurality of digital loop carriers can be executed by means of one controller.

According to the monitoring and controlling part of this embodiment, it is possible to communicate with a remote controller by using the overhead of the SONET, etc. in the network. It also becomes possible to monitor and control a plurality of digital loop carriers by means of one controller.

[FIFTH EMBODIMENT]

Figure 16:
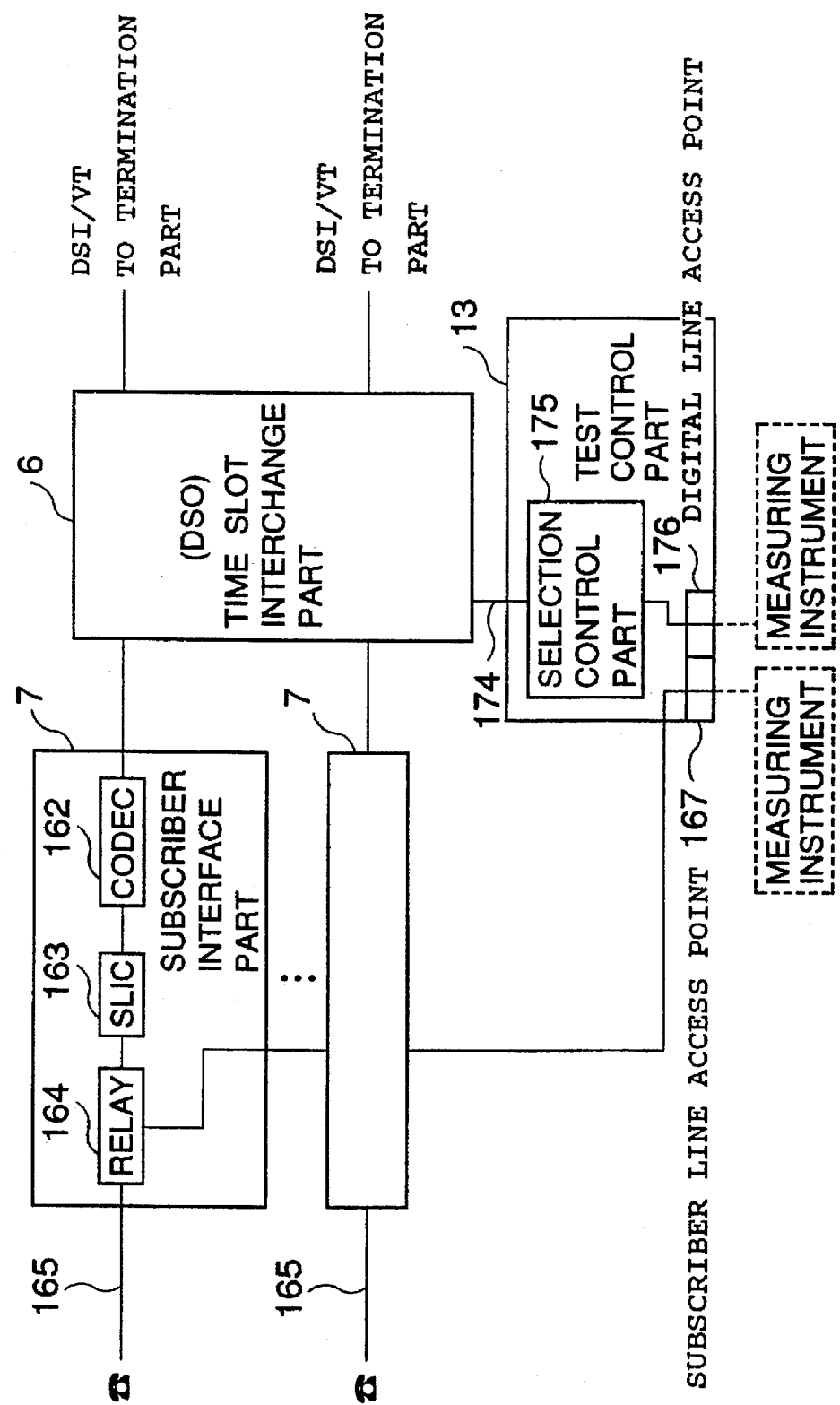
FIG. 16 is a block diagram showing the principle and construction of a subscriber test system of the digital loop carrier according to a fifth and sixth embodiments.

FIG. 16 is a block diagram showing the principle and construction of a subscriber test system of the digital loop carrier according to a fifth embodiment.

The fifth embodiment of the present invention provides a digital loop carrier, wherein the subscriber interface part comprises: a CODEC part for performing digital-to-analog conversion of an input/output signal for the time slot interchange part; an interface circuit which, disposed between the CODEC part and a subscriber line, supplies power to the subscriber and monitors the subscriber; a relay circuit disposed between the interface circuit and the subscriber line; and a test control part which drives the relay circuit so as to select any one of the subscriber line, when the subscriber line is to be tested, and leads the subscriber line to a subscriber leader line terminal to be connected to a measuring instrument.

An operator specifies, to the test control part 13, the numeral associated with a subscriber for which a test is to be carried out. The test control part 13 drives a relay circuit 164. This results in the subscriber line 165 to be led to a subscriber line access point 167. By connecting a measuring instrument to the subscriber line access point 167, the testing of the subscriber line can be carried out.

Figure 17:
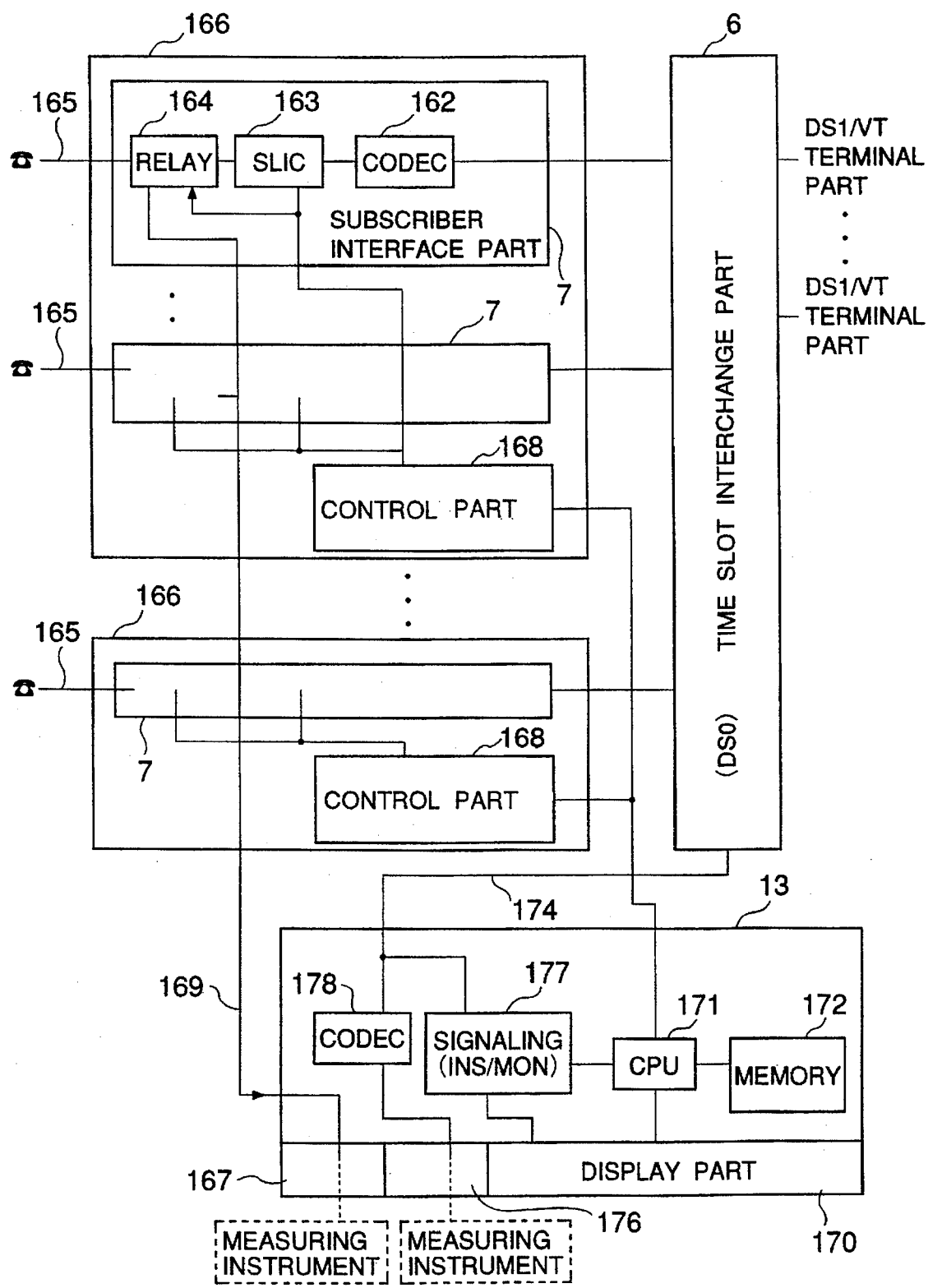
FIG. 17 is a block diagram showing the subscriber test system of the digital loop carrier according to the fifth and sixth embodiments.

FIG. 17 is a block diagram showing the subscriber test system of the digital loop carrier according to the fifth embodiment. The test control part 13 comprises a control part formed of a CPU 171 and a peripheral circuit 172, and of a display part 170 formed of switches and LEDs. The operator selects the subscriber line to be tested by using the display part 170.

The CPU 171 gives an instruction to a subscriber circuit control part 168 so as to drive the relay circuit 164. The subscriber interface part 7 needs a plurality of shelves 166 because a single shelf can not accommodate, for example, 2000 subscribers. Accordingly, the test control part 13, the subscriber interface part 7 and the subscriber circuit control part 168 are provided in different shelves, and an instruction from the CPU 171 is provided to the subscriber circuit control part 168 by a start-stop synchronization communication.

Upon receipt of the instruction, the subscriber circuit control part 168 confirms if the subscribe is busy or idle by using the interface circuit 163. If idle, the subscriber circuit control part 168 drives the relay circuit 164 and leads the subscriber line 165 to the subscriber line access point 167. If busy, the information indicating the busy state is supplied to the test control part 13 so that the same information is displayed in the display part 170. By executing an instruction called "Over Ride" through the display part 170, it becomes possible to lead the subscriber to the to be connected to the instrument irrespective of the idle or busy state.

One of two methods can be selected to lead the subscriber line to be connected to the instrument: a method whereby the subscriber line is disconnected and the subscriber line 165 and the subscriber circuit side are connected to the instrument; and a method whereby the subscriber line is not disconnected and monitored via a resistance.

According to the test control part of this embodiment, by specifying the numeral associated with the subscriber to be tested, the subscriber line can be lead to a subscriber line access point. By connecting the measuring instrument to the terminal, the test of the subscriber line can be carried out.

[SIXTH EMBODIMENT]

FIG. 16 is a block diagram showing the principle and construction of a subscriber test system of the digital loop carrier according to a sixth embodiment.

The sixth embodiment of the present invention provides a digital loop carrier, wherein the time slot interchange part has an input/output line for digital access, the test control part has a selection control part which controls the time slot interchange part via the input/output line for arbitrary subscriber line test so as to lead an audio signal from the time slot interchange part to a digital line access point.

An operator specifies, to the test control part 13, the numeral associated with a subscriber for which a digital access test is to be carried out. The test control part 13 controls the DS0 time slot interchange part 6 via the selection control part 175.

The above arrangement ensures that digital signal levels of the signal of the subscriber to be tested are led to the digital line access point 176, the digital signal levels occurring at a stage preceding the subscriber circuit. The selection control part 175 at a stage preceding the digital line access point 176 converts the digital signal into an audio signal, which is then extracted from the digital line access point 176. By connecting the measuring terminal to the digital access leader line terminal 176, it is possible to test the subscriber line. This arrangement of leading the signal outside at a stage preceding the subscriber circuit is effective to "bracket" fault locations.

FIG. 17 is a block diagram showing the subscriber test system of the digital loop carrier according to the sixth embodiment. Referring to FIG. 17, the selection control part 175 comprises a signaling insertion/monitoring part 177 connected to the CPU 171, and a CODEC 178.

An operator selects a subscriber signal to be subjected to digital access test by using the display party 170. The CPU 171 specifies the line to be accessed to the DS0 time slot interchange part 6 via the signaling insertion/monitoring part 177.

Upon reception of an instruction, the time slot interchange part 6 connects the corresponding line to the digital access leader line terminal 176. The signal carried by the line connected by the DS0 time slot interchange part 6 is converted into an audio signal by the CODEC 175 and extracted outside from the digital access leader line terminal 176.

In order to prevent the line in use from being disconnected out of carelessness, the subscriber circuit checks the busy or idle state using the start-stop synchronization communication with the subscriber circuit line control part 168. If idle, the above process is carried out. If busy, the above process is not carried out, and the failure to carry out the process is displayed in the display part 170. The subscriber circuit has the function of forcibly accessing the digital signal even if the subscriber line is busy.

Instead of leading the audio signal outside from the digital access leader line terminal 176, it is also possible to insert a signaling bit at a stage preceding the CODEC 175 by using the display part 170 and to monitor the signal.

According to the test control part of this embodiment, the signal of the subscriber to be tested is led to a leader line terminal as a digital signal via the time slot interchange part. By connecting the measuring instrument to the leader line terminal, it is possible to carry out the test of the subscriber line. This arrangement of leading the signal outside at a stage preceding the subscriber circuit is effective to "bracket" faulty locations.

[SEVENTH EMBODIMENT]

The systems of transmitting signaling codes between the exchange (not shown) and the optical fiber transmission line (on the DS1 line) include a in slot signaling system according to a conventional robbed bit insertion system, and a out slot signaling system such as a common channel signaling system.

In the in slot signaling system based on the robbed bit, signaling codes are turned into code bits (AB or ABCD bits), and a portion of the PCM audio digital data signal (hereinafter, simply referred to as data signal) is occupied by the code bits (in other words, the signaling codes are transmitted in slot). The above described system has a problem in that the data signal can not be transmitted in a complete form, and in that the positions of the signaling frame are shifted when the time slot interchange by means of the DCS (digital cross connect system) or ADM (add drop multiplexer) is carried out, thus making it difficult to transmit the signaling codes.

The common channel signaling system is configured such that a dedicated line for call control is provided so that the data signal and the signaling code are transmitted separately (that is, the signaling codes are transmitted according to the out slot system). In North America, the Bellcore's Technical Reference TR-TSY-000303 provides the common channel signaling system (CSC).

In the CSC, the signaling line is provided in the form of including the 1DS0 signal (64k b/s) in the DS1 signal. The signaling code is transmitted using this signaling line as a message in accordance with the protocol based on the CCITT Q.900. This signaling line (DS0) is called the CSC. According to an out slot signaling system such as this, the problems with the in slot signaling system can be resolved.

Most of the present transmission lines (DS1 lines) use the in slot signaling system but are expected to use the out slot signaling system in the future. It is essential that the out slot signaling system be applied to the apparatuses in order to resolve the aforementioned problems. Since a certain period of time is required before all the transmission lines come to use the out slot signaling system, it is required that the apparatus is adaptable to both systems during the transient period.

Figure 18:
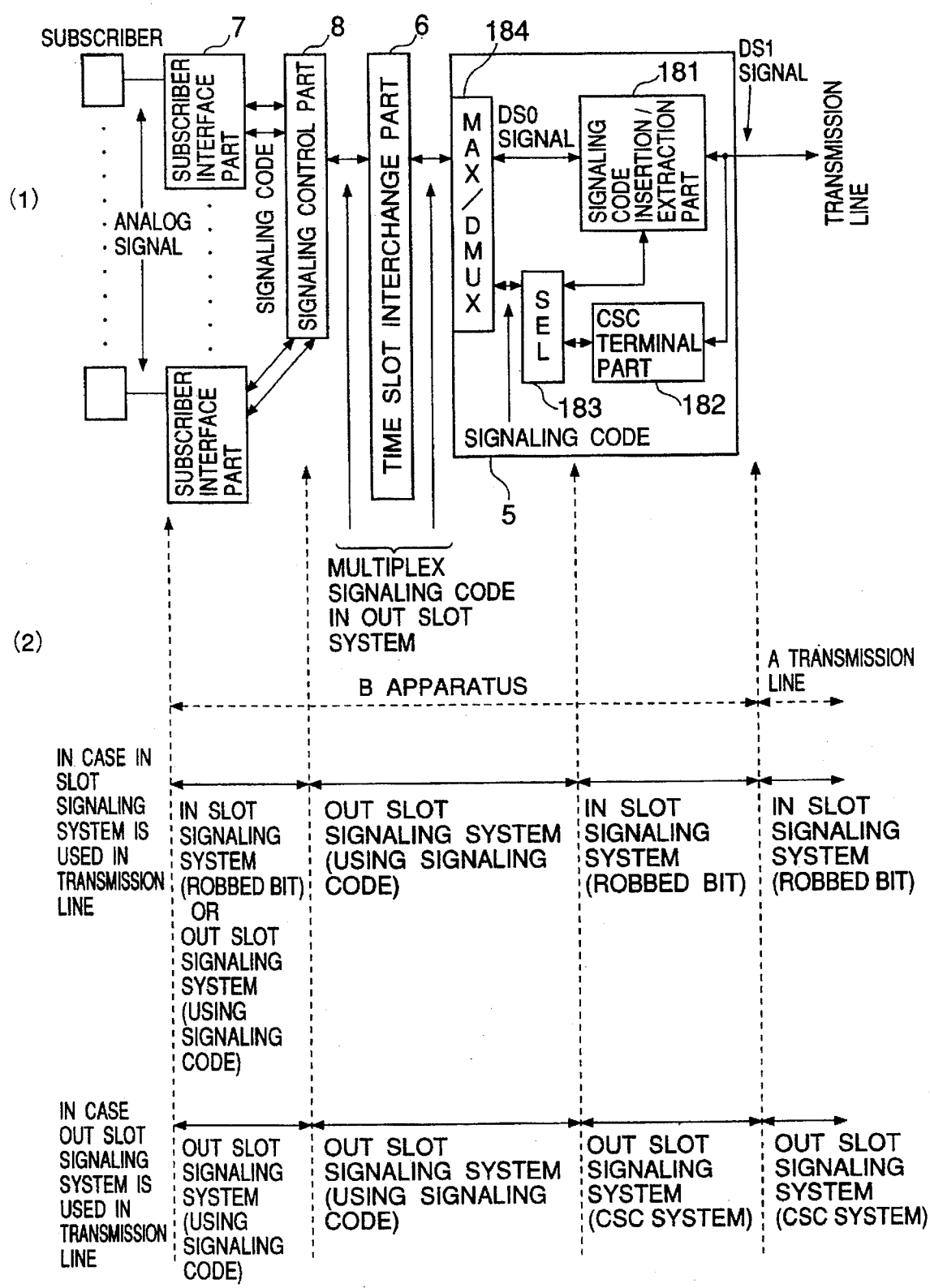
FIG. 18 is a block diagram showing the principle and construction of an apparatus signaling transmission system of the digital loop carrier according to a seventh embodiment.

FIG. 18 is a block diagram showing the principle and construction of an apparatus signaling transmission system of the digital loop carrier according to a seventh embodiment.

The seventh embodiment of the present invention provides a digital loop carrier, wherein the low-speed signal terminal part comprises: a signaling code insertion/extraction part for separating a data signal and in a slot signaling code; and a multiplexing/demultiplexing part multiplexes the signaling code so as to fit the time slot separate from the one used for the data signal and so as to be compatible with the out slot subscriber interface part, so that the out slot signaling system is applied to an extent ranging from the signal terminal part to an entrance stage of subscriber interface part, irrespective of the signaling system used in the optical fiber transmission line.

In a variation of the construction of the seventh embodiment, the digital loop carrier comprises: a signaling line terminal part for converting a signaling line message to a signaling code and vice versa; a selector for selecting either a signaling code from the signaling line terminal or a signaling code from the multiplexing/demultiplexing part, so that out slot signaling system is applied to an extent ranging from the signal terminal part to an entrance stage of subscriber interface part, irrespective of the signaling system used in the optical fiber transmission line.

In another variation of the construction of the seventh embodiment, when the in slot signaling system is used in the subscriber interface part, there is provided a signaling control part for converting the in slot signaling code to the out slot signaling code and vice versa.

Referring to FIG. 18, when the in slot signaling system is used in the transmission line, the signaling code is transmitted to the low-speed signal (DS1 signal) terminal part 5 (see FIG. 4) in the in slot system. A signaling code insertion/extraction part 181 provided in the DS1 signal terminal part separates the signaling code and the data signal (DS0 signal: 64k b/s). The signaling code is multiplexed to fit the time slot not occupied by the data signal and is transmitted to the subscriber interface part 7.

In other words, the out slot signaling system is applied to the signaling code transmission between the DS1 signal terminal part 5 and the subscriber interface part 7.

When the out slot signaling system is used in the transmission channel, the signaling code is transmitted over the signaling line (hereinafter, simply referred to as the CSC) to the DS1 signal terminal part 5. A CSC terminal part 182 extracts the signaling code, and the extracted code is multiplexed to fit the time slot not occupied by the data signal and is transmitted to the subscriber interface part 7.

A selector 183 selects one of the two signaling codes, that is, the signaling code output from the signaling code insertion/extraction part 181 and the CSC terminal part 182. In this way, it is possible to apply the out slot signaling system to an extent ranging from the transmission line to an entrance stage of the subscriber interface part 7, irrespective of the signaling system used in the transmission line.

If the signaling control part 8 has the function of shifting from the out slot signaling system to the in slot signaling system, it is possible to connect the subscriber interface of the in slot signaling system.

①  The low-speed signal terminal part 5

Figure 19:
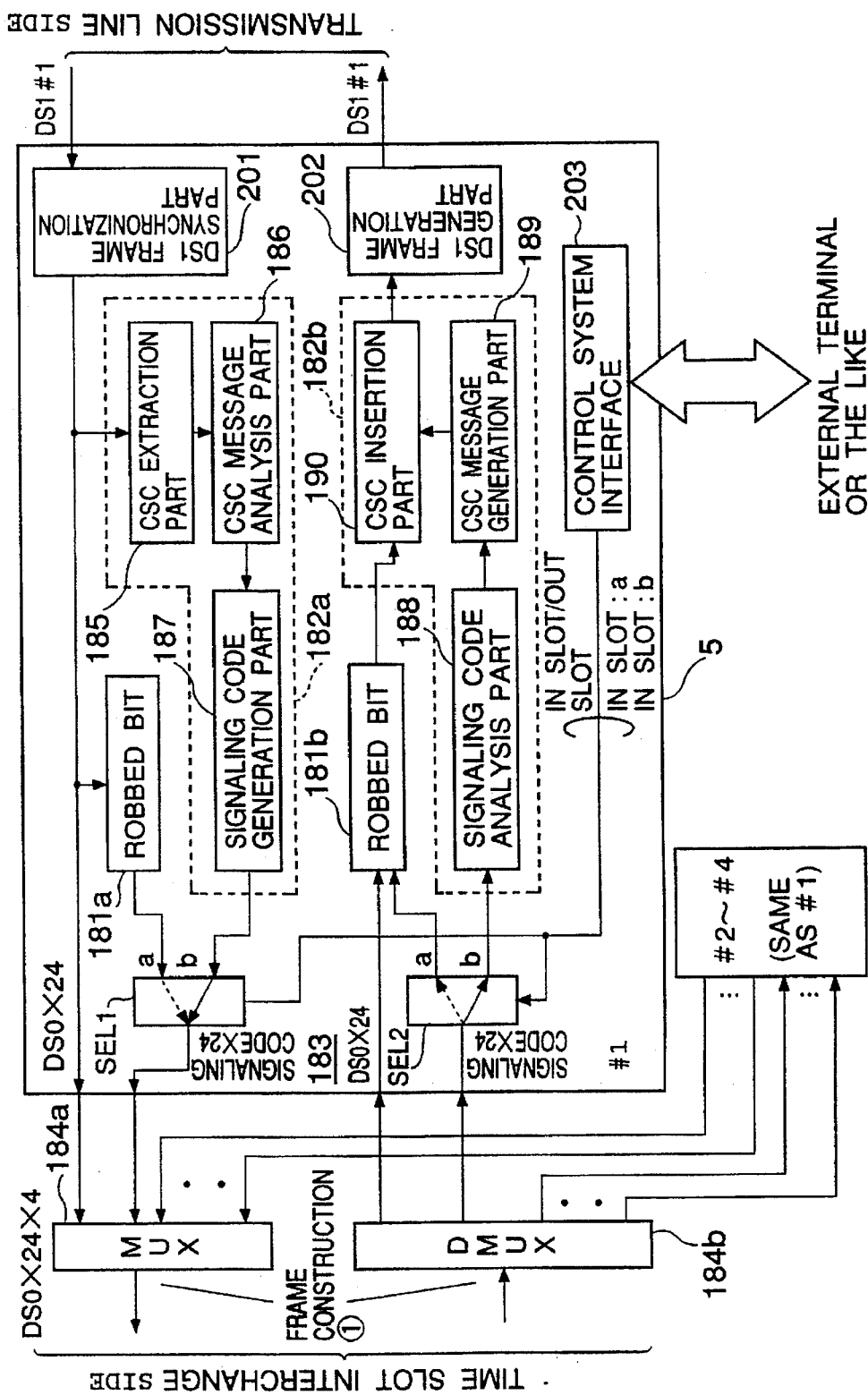
FIG. 19 is a block diagram showing an embodiment of a DS1 signal termination part used in the digital loop carrier according to the seventh embodiment.

FIG. 19 is a block diagram showing an embodiment of a DS1 signal terminal part used in the digital loop carrier according to the seventh embodiment. The received signal is subjected to frame synchronization by a DS1 frame synchronization part 201 in accordance with various frame formats of the DS1 signal. When the in slot signaling system is used in the transmission line, the signaling code based on the robbed bit is separated from the data signal by means of a signaling code extraction part 181a and is made to pass through a selector SEL1 constituting the selector 183. A multiplexing part 184a constituting a multiplexing/demultiplexing part 184 multiplexes the signaling code and the DS0 data signal so that the signaling code is converted into the out slot signaling code and sent to the subscriber.

For adaptability to the CSC, the CSC terminal part 182 includes a CSC terminal part 182a for the received signal. The CSC terminal part 182a comprises a CSC extraction part 185, a CSC message analysis part 186 and a signaling code generation part 187.

When the CSC system is used in the transmission line, the received CSC message is extracted by the CSC extraction part 185. The CSC message analysis part 186 analyzes the signaling information (or the message). The signaling code generation part 187 converts the CSC message into the corresponding signaling code. The signaling code is selected by the selector SEL1, multiplexed together with the DS0 data signal by the multiplexing part 184a, and sent to the subscriber after being converted into the out slot signaling code.

The multiplexed signaling code to be transmitted is demultiplexed by a demultiplexing part 184b and made to pass through a selector SEL2. When the in slot signaling system is used in the transmission line, a signaling code insertion part 181b inserts the signaling bit in the DS0 data signal (robbed bit), the resultant signal being built into the DS1 signal frame by the DS1 frame generation part 202. At this stage, the CSC is not inserted.

When the out slot signaling system is used in the transmission line, the signaling code is made to pass through the selector SEL2 and sent to a CSC terminal part 182b. The CSC terminal part 182b comprises a signaling code analysis part 188, a CSC message generation part 189 and a CSC insertion part 190. The signaling code is converted into the CSC message by the signaling code analysis part 188 and the CSC message generation part 189. The CSC insertion part 190 inserts the CSC message in the time slot positions provided according to the CSC system.

The control of the selectors SEL1 and SEL2 are effected by an external terminal via a control system interface 203.

Figure 20:
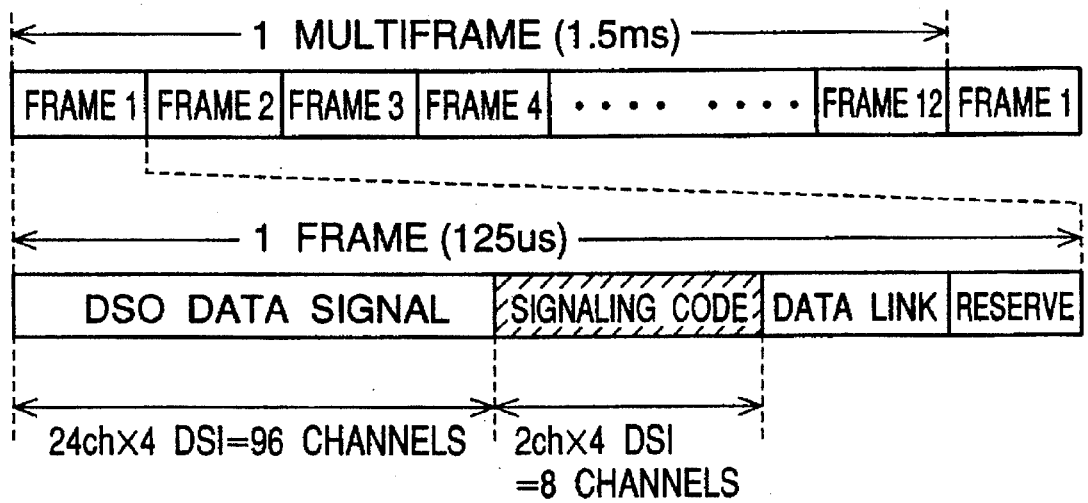
FIG. 20 is a time chart showing the frame construction ① used between the DS1 signal termination part and the DS0 time slot interchange part used in the digital loop carrier according to the seventh embodiment.

FIG. 20 is a time chart showing the frame construction ① between the time slot interchange part 6 and the multiplexing part 184a/demultiplexing part 184b. It will be noted that the signaling code and the DS0 data are provided in separated time slots (out slots).

According to this construction, even if the CSC system is employed in the transmission line, the out slot signaling system is applied to an extent ranging from the DS1 signal terminal part 5 to an entrance stage of the subscriber interface part 7. Therefore, the same hardware as the one used in the in slot signaling system can be used to construct the transmission line.

② The signaling control part 8

Figure 21:
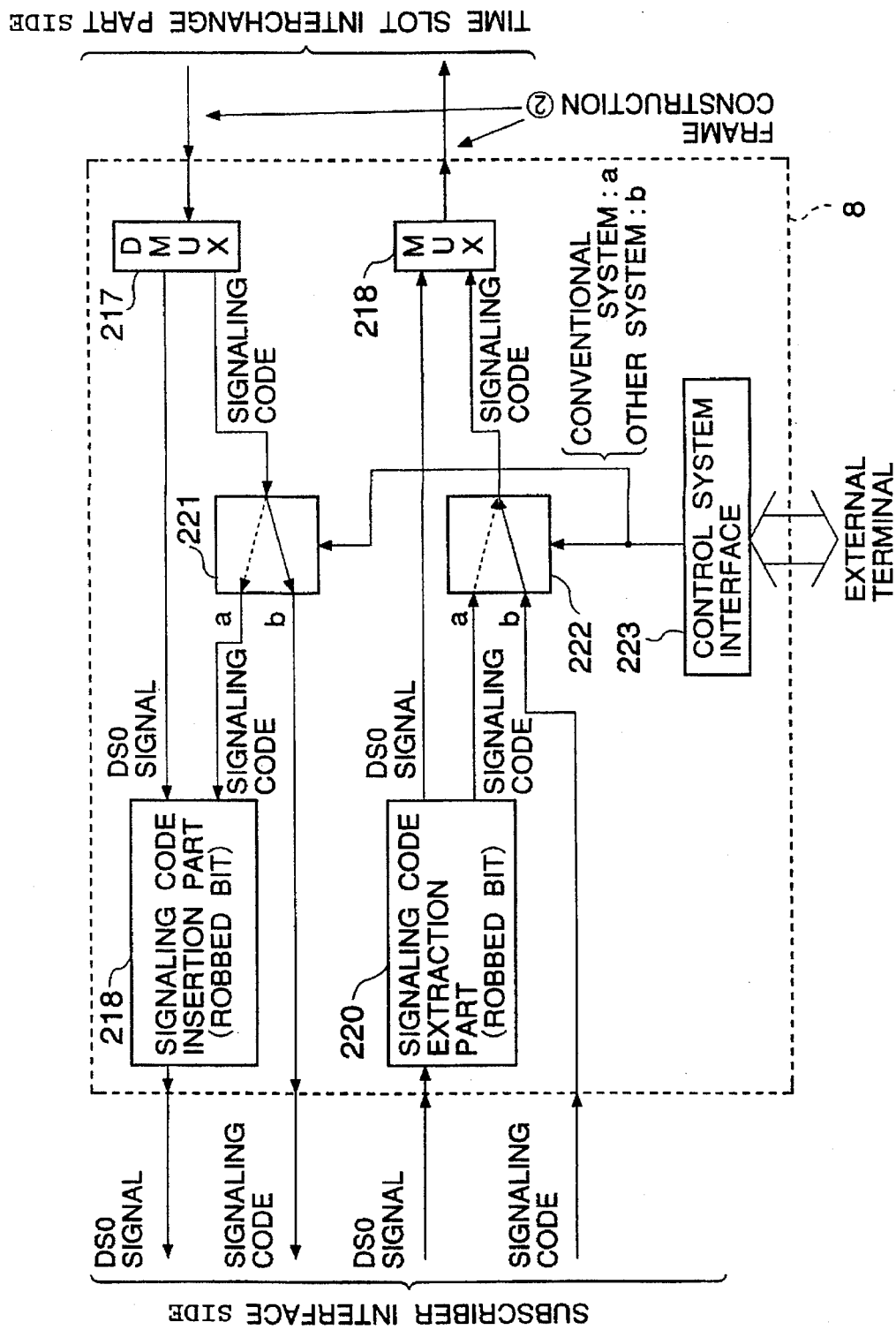
FIG. 21 is a block diagram showing the signaling control part used in the digital loop carrier according to the seventh embodiment.

FIG. 21 is a block diagram showing the signaling control part 8 used in the subscriber transmission part according to the seventh embodiment. The multiplexed signal received from the DS0 time slot interchange part 6 is demultiplexed into the DS0 data signal and the signaling code by a demultiplexing part 217. When the subscriber interface part 7 is of the conventional configuration (i.e. dedicated to the in slot signaling system), a selector 221 allocate the signaling code to "a". A signaling code insertion part 219 inserts the signaling code back into the DS0 data signal (robbed bit) and sends the resultant signal to the subscriber interface part 7.

When the subscriber interface part 7 is of the out slot signaling system, the selector allocates the signaling code to "b". The signaling code is as it is to the subscriber interface part 7 over a path separate from the one used for the DS0 data signal.

When the subscriber interface part 7 is of the conventional configuration, the signaling code to be transmitted is inserted in the DS0 data signal and the resultant signal is input to the signaling control part 8. A signaling code extraction part 220 extracts the signaling code. The extracted code is made to pass through a selector 222, multiplexed together with the DS0 data signal by a multiplexing part 218, and sent to the time slot interchange part 6.

When the out slot signaling system is used in the subscriber interface part 7, the signaling code is transmitted from the subscriber interface part 7 over a path separate from the one used for the DS0 signal. Therefore, the signaling code is made to pass through the selector 222, multiplexed as it is by the multiplexing part 218 and sent to the time slot interchange part 6.

The switching control of the selectors 221 and 222 according to the system used in the subscriber interface part 7 is effected by an external terminal via the control interface 223.

Figure 22:
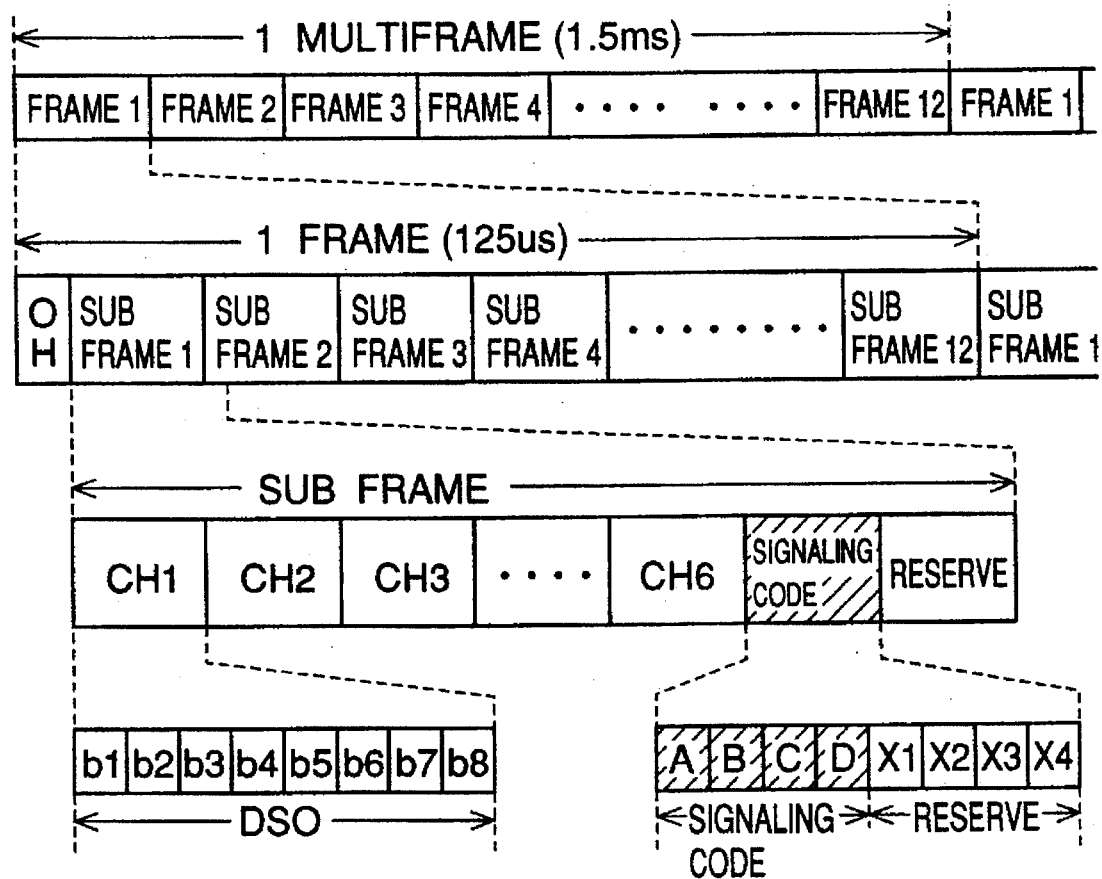
FIG. 22 is a time chart showing the frame construction ② used between the DS0 time slot interchange part and the signaling control part used in the digital loop carrier according to the seventh embodiment.

FIG. 22 is a time chart showing the frame construction ② used between the time slot interchange part 6 and the multiplexing part 217/demultiplexing part 218. The signaling code is multiplexed to fit the sub-frame in a plurality of frames which constitute a multi-frame, resulting in the out slot signaling frame.

According to the signaling control part of the digital loop carrier according to the seventh embodiment, it is possible to adapt not only to the conventional in slot signaling system of the transmission line but to the out slot signaling system which is expected to be used in the future.

The present invention is not limited to the above described embodiments, and variations and modifications may be made without departing from the scope of the present invention.

What is claimed is:

1. A digital loop carrier disposed between a switching unit and a plurality of subscribers, said digital loop carrier comprising:

a high-speed optical interface part connected to an optical fiber transmission line;

cross connect means including a cross connect part for an STS-1 signal level and a cross connect part for a VT signal level, for switching, to different lines, a high-speed signal input to and output from said optical interface part, and for separating said high-speed signal to obtain a low-speed signal;

signal termination means including a signal termination part for a VT signal level and a signal termination part for a DS1 signal level, for separating the low-speed signal obtained from said cross connect means to obtain a subscriber signal;

a time slot interchange part, coupled to said signal termination means for connecting calls for each subscriber; and a plurality of interface parts each for performing analog-to-digital conversion and digital-to-analog conversion, to serve as an interface for a respective subscriber, wherein said cross connect means has the function of switching an output signal from said optical interface part to 3 channels of STS1 high-speed signals, performs line switching on an arbitrary basis, obtains 84 channels of VT1.5 signals, and switches lines for the 84 channels of VT1.5 signals.

2. A digital loop carrier disposed between a switching unit and a plurality of subscribers, said digital loop carrier comprising:

a high-speed optical interface part connected to an optical fiber transmission line;

cross connect means including a cross connect part for an STS-1 signal level and a cross connect part for a VT signal level, for switching, to different lines, a high-speed signal input to and output from said optical interface part, and for separating said high-speed signal to obtain a low-speed signal;

signal termination means including a signal termination part for a VT signal level and a signal termination part for a DS1 signal level, for separating the low-speed signal obtained from said cross connect means to obtain a subscriber signal;

a time slot interchange part, coupled to said signal termination means for connecting calls for each subscriber;

a plurality of interface parts each for performing analog-to-digital conversion and digital-to-analog conversion, to serve as an interface for a respective subscriber, and a call control part connected to the time slot interchange part, said call control part comprising:

a subscriber call origination information detection part for detecting latest subscriber call origination information;

a subscriber call origination information variation detection part for comparing, for the same subscriber, current call origination information with immediately preceding call origination information so as to detect a difference between said current call origination information and said immediately preceding call origination information, and for detecting whether or not a call has been issued from the subscriber or whether or not a call origination has been completed;

a subscriber call origination information processing part for identifying the subscriber corresponding to said detected difference, and for issuing a subscriber time slot connection/release request to the switching unit; and a subscriber line connection processing part for connecting, after the request is issued to the switching unit, said subscriber to the time slot specified by the switching unit.

3. The digital loop carrier as claimed in claim 2, wherein said subscriber call origination information detection part includes a subscriber information NEW register which stores latest subscriber call origination information, said subscriber call origination information variation detection part includes a subscriber information NEW-1 register which stores the call origination information, and said subscriber call origination information processing part compares the contents of said NEW register and the NEW-1 register so as to subject the comparison result to software process and to use the comparison result to update the content of said NEW-1 register.

4. The digital loop carrier as claimed in claim 2, wherein said subscriber call origination information detection part divides subscriber information into blocks so as to deal with a case where the amount of information for each subscriber is large, and provides the latest subscriber call origination information to said subscriber call origination information variation detection part in units of blocks.

5. The digital loop carrier as claimed in claim 2, wherein said subscriber call origination information detection part rearranges the subscriber call origination information by converting the subscriber call origination information into the same arrangement as the format of the data area of the command provided according to a predetermined standard, so that the call origination information can be transmitted to the appropriate switching unit without converting the format of the call origination information.

6. The digital loop carrier as claimed in claim 2, wherein said subscriber call origination information detection part makes it appear that the call origination/call termination information of a non-concentration subscriber always indicates a call origination state, even when the concentration service and the non-concentration service coexist, so that the non-concentration service can be processed in the same manner as the concentration service.

7. A digital loop carrier disposed between a switching unit and a plurality of subscribers, said digital loop carrier comprising:

a high-speed optical interface part connected to an optical fiber transmission line;

cross connect means including a cross connect part for an STS-1 signal level and a cross connect part for a VT signal level, for switching, to different lines, a high-speed signal input to and output from said optical interface part, and for separating said high-speed signal to obtain a low-speed signal;

signal termination means, including a signal termination part for a VT signal level and a signal termination part for a DS1 signal level, for separating the low-speed signal obtained from said cross connect means to obtain a subscriber signal;

a time slot interchange part, coupled to said signal termination means for connecting calls for each subscriber;

a plurality of interface parts each for performing analog-to-digital conversion and digital-to-analog conversion, to serve as an interface for a respective subscriber, and a signal transmission part formed of two units provided between said time slot interchange part and said subscriber interface part, a first unit comprising means for generating a transmission clock and means for sending said transmission clock and transmission data synchronized to said transmission clock, a second unit comprising means for receiving said transmission data in accordance with said transmission clock and means for transmitting reception data in synchronization with said transmission clock, wherein said first unit further comprises means for generating a clock having double the frequency of said transmission clock, means for detecting the phase of the reception clock of said reception data in accordance with said clock having double frequency, and means for receiving said reception data in accordance with said reception clock.

8. The digital loop carrier as claimed in claim 7, wherein said second unit comprises means for detecting a frame misalignment of said reception data, wherein, when said frame misalignment is detected, said means for detecting the phase performs re-hunting of the clock phase.

9. A digital loop carrier disposed between a switching unit and a plurality of subscribers, said digital loop carrier comprising:

a high-speed optical interface part connected to an optical fiber transmission line;

cross connect means including a cross connect part for an STS-1 signal level and a cross connect part for a VT signal level, for switching, to different lines, a high-speed signal input to and output from said optical interface part, and for separating said high-speed signal to obtain a low-speed signal;

signal termination means including a signal termination part for a VT signal level and a signal termination part for a DS1 signal level, for separating the low-speed signal obtained from said cross connect means to obtain a subscriber signal;

a time slot interchange part, coupled to said signal termination means for connecting calls for each subscriber; and a plurality of interface parts each for performing analog-to-digital conversion and digital-to-analog conversion, to serve as an interface for a respective subscriber, wherein said subscriber interface part comprises:

a CODEC part for performing digital-to-analog conversion of an input/output signal for said time slot interchange part;

an interface circuit which, disposed between said CODEC part and a subscriber line, supplies power to the subscriber and monitors the subscriber;

a relay circuit disposed between said interface circuit and said subscriber line; and a test control part which drives said relay circuit so as to select any one of the subscriber line, when the subscriber line is to be tested, and leads said subscriber line to a subscriber line access point to be connected to a measuring instrument.

10. The digital loop carrier as claimed in claim 9, wherein said time slot interchange part has an input/output line for digital access, said test control part has a selection control part which controls said time slot interchange part via said input/output line for arbitrary subscriber line test so as to lead an audio signal from said time slot interchange part to a digital line access point.

11. A digital loop carrier disposed between a switching unit and a plurality of subscribers, said digital loop carrier comprising:

a high-speed optical interface part connected to an optical fiber transmission line;

cross connect means, including a cross connect part for an STS-1 signal level and a cross connect part for a VT signal level, for switching, to different lines, a high-speed signal input to and output from said optical interface part, and for separating said high-speed signal to obtain a low-speed signal;

signal termination means, including a signal termination part for a VT signal level and a signal termination part for a DS1 signal level, for separating the low-speed signal obtained from said cross connect means to obtain a subscriber signal;

a time slot interchange part, coupled to said signal termination means for connecting calls for each subscriber; and plurality of interface parts each for performing analog-to-digital conversion and digital-to-analog conversion, to serve as an interface for a respective subscriber, wherein said signal termination means comprises:

a signaling code insertion/extraction part for separating a data signal and a slot signaling code; and a multiplexing/demultiplexing part which multiplexes said signaling code so as to fit the time slot separate from the one used for the data signal and so as to be compatible with an out slot subscriber interface part, so that an out slot signaling system is applied to an extent ranging from said signal termination means to an entrance stage of the subscriber interface part, irrespective of a signaling system used in said optical fiber transmission line.

12. The digital loop carrier as claimed in claim 11, said digital loop carrier comprising:

a signaling line terminal part for converting a signaling line message to a signaling code and vice versa;

a selector for selecting either a signaling code from said signaling line terminal or a signaling code from said multiplexing/demultiplexing part, so that out slot signaling system is applied to an extent ranging from said signal terminal part to an entrance stage of subscriber interface part, irrespective of the signaling system used in said optical fiber transmission line.

13. The digital loop carrier as claimed in claim 11, wherein, when the in slot signaling system is used in said subscriber interface part, there is provided a signaling control part for converting the in slot signaling code to the out slot signaling code and vice versa.

\* \* \* \* \*